US011433310B2

(12) United States Patent
Walker et al.

(10) Patent No.: US 11,433,310 B2
(45) Date of Patent: Sep. 6, 2022

(54) METHOD FOR CREATING A VIRTUAL OBJECT

(71) Applicant: LEGO A/S, Billund (DK)

(72) Inventors: Morgan James Walker, Aarhus C (DK); Jonathan B. Bennink, Aarhus C (DK); Henrik Munk Storm, Randbøl (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 16/310,524

(22) PCT Filed: Jul. 4, 2017

(86) PCT No.: PCT/EP2017/066598
§ 371 (c)(1),
(2) Date: Dec. 17, 2018

(87) PCT Pub. No.: WO2018/007369
PCT Pub. Date: Jan. 11, 2018

(65) Prior Publication Data
US 2019/0240581 A1    Aug. 8, 2019

(30) Foreign Application Priority Data

Jul. 5, 2016 (DK) .............................. PA201670492
Apr. 25, 2017 (DK) .............................. PA201770277

(51) Int. Cl.
A63F 13/65      (2014.01)
A63F 13/213     (2014.01)
(Continued)

(52) U.S. Cl.
CPC ............ A63F 13/65 (2014.09); A63F 13/213 (2014.09); A63F 13/533 (2014.09); A63F 13/63 (2014.09)

(58) Field of Classification Search
CPC ...... A63F 13/213; A63F 13/533; A63F 13/65; A63F 13/63
See application file for complete search history.

(56) References Cited

U.S. PATENT DOCUMENTS 5,815,147 A      9/1998 Bogen et al.
6,259,815 B1 *   7/2001 Anderson ............ G06K 9/6206
                                           382/218

(Continued)

FOREIGN PATENT DOCUMENTS

CN    101675458 A    3/2010
CN    102458595 A    5/2012

(Continued)

OTHER PUBLICATIONS

Danish PTO Search Report issued in priority patent application No. PA 2017 70277, dated Jul. 5, 2017.

(Continued)

Primary Examiner — Seng H Lim
(74) Attorney, Agent, or Firm — Day Pitney LLP; Anthony A. Kassas

(57) ABSTRACT

A computer-implemented method for creating a virtual object; the method comprising: obtaining a digital representation of a real-world object, the digital representation representing a visual appearance of a shape of the real-world object; obtaining an input indicative of one or more properties of an entity different from the real-world object; creating a virtual object representing the real-world object; and assigning, based on at least the obtained input, an attribute to the created virtual object.

20 Claims, 13 Drawing Sheets

(51) Int. Cl.
*A63F 13/533* (2014.01)
*A63F 13/63* (2014.01)

(56) References Cited

U.S. PATENT DOCUMENTS

| | | | |
|---|---|---|---|
| 6,290,565 B1* | 9/2001 | Galyean, III | A63H 3/16 |
| | | | 273/148 B |
| 7,397,464 B1 | 7/2008 | Robbins et al. | |
| 7,439,972 B2 | 10/2008 | Timcenko | |
| 7,596,473 B2* | 9/2009 | Hansen | G06F 17/50 |
| | | | 703/1 |
| 8,023,724 B2 | 9/2011 | Barbour | |
| 8,128,500 B1 | 3/2012 | Borst et al. | |
| 9,229,528 B2* | 1/2016 | Numaguchi | G06F 3/01 |
| 9,409,084 B2* | 8/2016 | Horovitz | A63F 13/06 |
| 9,555,326 B2* | 1/2017 | Scott | A63F 13/235 |
| 9,595,108 B2* | 3/2017 | Horovitz | A63F 13/65 |
| 10,089,772 B2* | 10/2018 | Taylor | G06T 13/40 |
| 10,252,178 B2 | 4/2019 | Reid et al. | |
| 2002/0196250 A1* | 12/2002 | Anderson | G06T 19/00 |
| | | | 345/420 |
| 2005/0093874 A1 | 5/2005 | Levene et al. | |
| 2005/0128212 A1 | 6/2005 | Edecker et al. | |
| 2009/0066690 A1 | 3/2009 | Harrison | |
| 2009/0271436 A1 | 10/2009 | Reisinger | |
| 2010/0146085 A1 | 6/2010 | Van Wie et al. | |
| 2011/0032255 A1 | 2/2011 | Favier et al. | |
| 2011/0086702 A1 | 4/2011 | Borst et al. | |
| 2011/0298922 A1* | 12/2011 | Horovitz | A63F 13/06 |
| | | | 348/143 |
| 2012/0069051 A1 | 3/2012 | Hagbi et al. | |
| 2012/0295703 A1* | 11/2012 | Reiche | A63F 13/95 |
| | | | 463/31 |
| 2012/0306853 A1* | 12/2012 | Wright | G06T 19/20 |
| | | | 345/419 |
| 2013/0052907 A1 | 2/2013 | Pedersen et al. | |
| 2014/0028712 A1 | 1/2014 | Keating et al. | |
| 2014/0253540 A1 | 9/2014 | Dori et al. | |
| 2014/0273717 A1 | 9/2014 | Judkins et al. | |
| 2015/0058229 A1 | 2/2015 | Wiacek et al. | |
| 2015/0355805 A1 | 12/2015 | Chandler et al. | |
| 2015/0356779 A1 | 12/2015 | Osterhout et al. | |
| 2016/0189493 A1 | 6/2016 | Rihn | |
| 2017/0189797 A1* | 7/2017 | Muthyala | A63F 13/655 |

FOREIGN PATENT DOCUMENTS

| | | |
|---|---|---|
| CN | 102713931 A | 10/2012 |
| CN | 103582902 A | 2/2014 |
| GB | 201419928 | 12/2014 |
| GB | 2532075 A | 5/2016 |
| WO | 2004/034333 A1 | 4/2004 |
| WO | 2008065458 A2 | 6/2008 |
| WO | 2010025559 A1 | 3/2010 |
| WO | 2011/017393 A1 | 2/2011 |
| WO | 2015/185629 A2 | 12/2015 |
| WO | 2016/050757 A1 | 4/2016 |
| WO | 2016/075081 A1 | 5/2016 |
| WO | 2016075081 A1 | 5/2016 |

OTHER PUBLICATIONS

Danish PTO Search Report issued in priority patent application No. PA 2016 70492, dated Feb. 3, 2017.
International Search Report, issued in related international application No. PCT/EP2017/066566, dated Nov. 21, 2017.
Written Opinion of the International Searching Authority, issued in related international application No. PCT/EP2017/066566, dated Nov. 21, 2017.
Notification and International Preliminary Report on Patentability accompanied with Annexes (7 Sheets), issued in related international application No. PCT/EP2017/066566, dated Aug. 30, 2018.
Ma et al., "Rapid Acquisition of Specular and Diffuse Normal Maps from Polarized Spherical Gradient Illumination", Eurographics Symposium on Rendering, The Eurographics Association 2007. (12 pages).
International Search Report issued in corresponding international application No. PCT/EP2017/066598, dated Nov. 21, 2017.
Written Opinion of the International Search Authority in corresponding international application No. PCT/EP2017/066598, dated Nov. 21, 2017.
First Office Action issued in corresponding Chinese patent application No. P201780049708 8, dated Aug. 25, 2021, 21 pages (English translation only).

* cited by examiner

METHOD FOR CREATING A VIRTUAL OBJECT

CROSS-REFERENCE TO RELATED APPLICATIONS

This application is a U.S. National Stage of International Application No. PCT/EP2017/066598, filed on 4 Jul. 2017 and published on 11 Jan. 2018, as WO 2018/007369 A1, which claims the benefit of priority to Danish Patent Application No. DK PA201670492, filed on 5 Jul. 2016 and Danish Patent Application No. PA201770277, filed on 25 Apr. 2017. The content of each of the above referenced patent applications is incorporated herein by reference in its entirety for any purpose whatsoever.

FIELD OF THE INVENTION

The invention relates to a computer-implemented method of creating a virtual object based on a digital representation of a real-world object, such as a toy construction model constructed from toy construction elements of a toy construction system.

BACKGROUND

Toy construction systems have been known for decades. Over the years, simple box-shaped building blocks have been supplemented with other construction elements with either a specific appearance or a mechanical or electrical function to enhance the play value. Such functions include e.g. motors, switches and lamps, but also programmable processors that accept input from sensors and can activate function elements in response to received sensor inputs.

Several attempts have been made to control virtual game play by means of real-world, physical toys.

For example, US 2011/298922 discloses a system for extracting an image of a physical object. The extracted image can be digitally represented on a display device as part of a virtual world, or video game, where the objects inhibiting the virtual world and/or video game, were designed and built from the construction set in the real-world. However, in many video games or other virtual environments it is desirable to provide three-dimensional virtual objects that experience a rich behaviour.

According to at least one aspect, it is thus desirable to provide a process for creating three-dimensional virtual objects that exhibit a rich functional behaviour from real-world objects in a user-friendly manner. In particular, it is desirable to provide such a method in which the user is not required to go through a large number of steps to configure and modify the resulting virtual object, e.g. where the creation of the virtual object is performed in at least a partly automated fashion, requiring only little user interaction.

WO 2015/185629 discloses a toy construction system comprising a plurality of toy construction elements and an image capture device operable to capture one or more images of a toy construction model constructed from one or more of said toy construction elements. This prior art system further comprises a processor configured to determine one or more visual attribute parameters indicative of a respective visual attribute derivable from one or more of a color, a shape and a size of the toy construction model. The processor is further configured to create a virtual object in a computer-generated virtual environment, and to control the virtual object in the computer-generated virtual environment to have a behaviour based on the determined one or more visual attribute parameters.

According to at least one aspect, it is desirable to provide a method and system that allow three-dimensional virtual objects to be created from real-world objects, such as from real-world toy construction models, in a user-friendly yet, preferably, reliable and accurate manner. In particular, it is desirable to provide methods and systems that are easy to use and that provide 3D representations of virtual objects that have a high degree of functionality in a virtual environment such as in a video game. It is also desirable to provide virtual objects that accurately represent the 3D shape of a corresponding real-world object.

It is generally desirable to provide a toy construction system that enhances the educational and/or play value of the system. It is also desirable to provide a toy construction system wherein a set of construction elements may easily be used in different toy construction models and/or in combination with existing toy construction elements. Moreover it is desirable to provide a toy construction system that allows users, in particular children, to construct multiple toy models in a user-friendly, efficient, yet flexible and reliable manner. In particular, it is desirable to provide a toy construction system that allows a user-friendly and flexible manner of creating virtual objects in a virtual environment such as a game system.

Various aspects of the invention disclosed herein may address at least some of the disadvantages of prior art systems.

SUMMARY

According to a first aspect, disclosed herein is a method, implemented by a data processing system, for creating a virtual object in a virtual environment; the method comprising:
  obtaining a digital representation of a real-world object, the digital representation representing a visual appearance of a shape of the real-world object;
  obtaining an input indicative of one or more properties of an entity different from the real-world object;
  creating a virtual object representing the real-world object; and
  assigning, based on at least the obtained input, an attribute to the created virtual object.

Consequently, one or more captured images of the real-world object, or another form of digital representation of the visual appearance of the real-world object, may be used by a data processing system executing the method as a basis for generating a virtual object having a user-defined appearance and attributes in a virtual environment. For example, a user may create a real-world toy construction model or otherwise select or create a real-world object resembling an asset to be used as a virtual object in a computer-generated virtual environment. The method provides the user with a flexible, yet easy-to understand and easy-to use mechanism for influencing the desired appearance and attributes of the virtual object in the virtual environment.

In particular, virtual environments and play scenarios with rich functional behaviour may be created when attributes are assigned to the virtual object based on one or more properties of an entity different from the real-world object, e.g. based on one or more properties of the data processing system executing the method, of the virtual environment, of another virtual object, of a device external to the data processing system, of a user of the data processing system, of a physical environment of the data processing system, of a network environment of the data processing system, or of a combination thereof.

As the user may construct the real-world object from toy construction elements, the user has a large degree of freedom as to how the object is constructed.

The digital representation of the visual appearance of the real-world object may be a suitable representation indicative of a shape of the real-world object, e.g. a three-dimensional shape of the real-world object. In particular, the digital representation may represent a point cloud and/or a surface geometry of the real-world object. The digital representation may further include information of visible properties of the real-world object, e.g. one or more colors, surface texture, and/or the like. For example, the digital representation may be a surface representation, e.g. in the form of a 3D mesh, or a volume representation, e.g. a voxel-based representation, of the real-world object.

The process may obtain the digital representation in a number of ways. In particular, the process may receive the digital representation or create the digital representation from other suitable input data.

In particular, in some embodiments, obtaining the digital representation may comprise receiving a previously created digital representation, e.g. by retrieving a digital representation from a data storage device, by downloading a digital representation from a remote data processing system or computer network, or by otherwise transferring the digital representation from one device to another device.

In some embodiments, the process may receive the digital representation or the other input data from one or more sensor devices operable to sense a visual appearance, e.g. shape and/or color, of the real world object. To this end, the sensor device may be operable to capture radiation from the real-world object. A sensor device may comprise one or more sensors that detect light or other forms of electromagnetic radiation, such as light or other electromagnetic radiation reflected by surfaces of a real-world object in a field of view of the sensor device. The sensor device may comprise an array of sensors, such as a CCD chip, or a single sensor that is operable to scan across a field of view, or a combination of a number of sensors that are scanned. Hence, the real-world object may be passive in that it does not need to actively emit any sound, light, radio-signals, electrical signals, or the like. Moreover, the sensor device may be operable to sense the visual appearance of the real-world object, e.g. to capture radiation, in a contactless fashion and/or without the establishment of any electrical contact, communications interface or the like between the sensor device and the real-world object.

In some embodiments, the sensor device comprises an image capture device operable to capture two or more images of the real-world object when the real-world object is placed within a field of view of the image capture device, e.g. on a suitable object support, wherein the two or more images are taken from different viewpoints relative to the real-world object. Each image may be a picture or another form of two-dimensional representation of a field of view of the image capture device which representation allows the determination of a shape and/or color and/or size of an object within the field of view. The image may comprise a 2D array of pixels or other array elements, each array element representing sensed information associated with a point or direction within the field of view. The sensed information may include an intensity of a received radiation or wave, a frequency/wavelength of the received radiation or wave, a distance map, a polarisation map, a map of surface normal, and/or other suitable sensed quantity.

Accordingly, the image capture device may comprise one or more digital cameras responsive to visible light, to infrared light, and/or the like. For example, the image capture device may comprise two digital cameras adapted at respective viewpoints relative to the object support, e.g. at respective elevations relative to the object support. The image capture device may comprise one or more depth cameras operable to also detect distance information of respective points within the field of view relative to the camera position. Some embodiments of a sensor device may comprise a laser. In some embodiments, the image capture device is configured to capture depth information in addition to light intensity data (such as RGB data). In some embodiments, the image capture device is configured to capture information indicative of surface normals of one or more surfaces within a field of view of the digital camera. For example, an image capture device may be configured to obtain polarisation data of the received light. The image capture device and/or the data processing system may be configured to determine local surface normals from the obtained polarisation data. The captured surface normals may also be transformed into a world coordinate system based on the detected tilt or other displacements of the turntable relative to the camera. Examples of camera sensors that are capable of detecting surface normals include the system disclosed in U.S. Pat. No. 8,023,724. Other examples of techniques for determining surface normal include the techniques described in "Rapid Acquisition of Specular and Diffuse Normal Maps from Polarized Spherical Gradient Illumination" by Wan-Cun Ma et al., Eurographics Symposium on Rendering (2007), Jan Kautz and Sumanta Pattanaik (Editors). The sensor device may output analogue or digital signals indicative of the captured radiation, e.g. of one or more captured images, e.g. as digital images or other data maps, as a video stream, and/or the like.

The digital representation may be a 2D or a 3D representation. The process for creating the digital representation may include multiple stages of a multi-stage process for creating a 2D or 3D digital representation based on the captured radiation, e.g. based on captured images. In some embodiments, the process uses a suitable scheme for sensor pose estimation, e.g. based on a non-repeating colored pattern arranged on a turntable on which the real-world object is placed. The colored pattern may then be image-processed macroscopically and/or through a distance-to-edge measurement. Other embodiments may use markers.

Accordingly, the process may comprise creating a 2D or 3D digital representation from light intensity data and/or from other sensed data, such as depth data, e.g. in the form of one or more depth maps, from polarisation data and/or surface normal data or a combination thereof. The process may use structure from motion techniques, space carving techniques or other suitable techniques. If the sensor provides a field of detected surface normals, these may be used to detect marker features, e.g. edges or corners or other features with abrupt changes in surface normal directions, for use in a structure from motion process. In other embodiments the detected surface normal may be used to transform a voxel representation of the object (e.g. as obtained by a space carving process) into an accurate surface mesh. Generally, the 3D digital representation may include any suitable type of representation, e.g. a surface mesh of polygons, a voxel representation, etc. or a combination thereof.

Generally, obtaining a digital representation by a sensor device operable to sense the visual appearance of the real-world object will also be referred to as "scanning" the real-world object.

The process creates a virtual object and it may associate a visual representation of the virtual object to the virtual object so as to allow rendering the virtual object within a virtual environment. The visual representation may be the obtained digital representation of the real-world object or a visual representation derived therefrom. For example, some embodiments of the method disclosed herein may process the received digital representation to create the visual representation of the virtual object. Examples of this processing may include one or more of the following: a change in the spatial resolution, a scaling, a modification of one or more colors, a smoothing operation, and/or the like. The visual representation of the virtual object may be a 2D representation or a 3D representation, e.g. in the form of a three-dimensional graphical representation. It is generally preferred that the virtual object has an appearance in the virtual environment that resembles the real-world object, i.e. that the visual representation defines a likeness of the real-world object or at least of the digital representation thereof. The created virtual object, optionally including its associated visual representation and/or associated attributes, may be transferred from one device to another device, stored by a data storage device, downloaded from a computer network and/or the like. For example, a user may scan multiple real-world objects, cause the process to create corresponding virtual objects and store the thus created virtual objects, e.g. for later use during a game, for sharing with friends etc. Hence, the user may create a personal library of virtual objects that have respective attributes associated with them. The virtual objects may then be used at a later point, e.g. as virtual characters, accessories, weapons, vehicles, etc.

In some embodiments, the process creates the visual representation as a data structure comprising a surface representation of the virtual object for drawing the virtual object. If movements of the virtual object are to be animated in the virtual environment, creating the visual representation of the virtual object may further include creating a data structure representing a skeleton of bones for animating the virtual object. Creating the visual representation may thus comprise creating the surface representation to define a shape and/or size/and/or color based on the detected shape and/or size and/or color of the real-world object and creating the skeleton to have a shape and size based on the detected shape and/or size of the real-world object. For example, creating the skeleton may comprise selecting one of a set of skeleton templates and a scaling the skeleton template based on the detected size and shape of the real-world object; in some embodiments, a single template may suffice. For example the template skeleton may be defined such that the virtual object is animated so as to resemble a certain type of figure, such as a human-like figure having arms and legs and being animated to resemble a walking figure, or an animal having four legs, or a bird having wings and performing a flying movement, or a fish or snake-like figure being animated to perform a swimming or gliding movement. Selecting a skeleton template may be performed automatically, e.g. based on the detected shape of the toy construction model, and/or based on a user selection, e.g. a selection of the type of character to be created, such as a fish, a snake, a four-legged animal, etc. In some embodiments, creating a skeleton of the virtual object is based on an obtained digital representation of another real-world object, e.g. a skeleton real-world object representing a skeleton of the real-world object from which a virtual object is created.

In some embodiments, the process creates the visual representation (e.g. a 3D representation) of the virtual object such that the virtual object—or only a part of the virtual object—appears to be constructed from toy construction elements. To this end, the process may create a virtual construction model created from virtual construction elements corresponding to the real-world toy construction elements of the toy construction system. In particular, in some embodiments, the process creates a data structure comprising information about a number of construction elements and their relative position and orientation relative to another and/or relative to a suitable coordinate system. The data structure may further comprise information, for each construction element of the virtual model, about the type of construction element, its color and/or further features, such as a weight, surface texture and/or the like. In some embodiments, the data structure representing a virtual construction element further comprises information about the type and positions of the coupling members of the construction element. Accordingly, the data structure of the virtual model may comprise connectivity information indicative of which virtual construction elements are interconnected with each other via which of their respective coupling members. An example of such a data structure is described in U.S. Pat. No. 7,439,972.

Alternatively or additionally, the process may create the visual representation with visible recurring features common to all or some toy construction elements of the system, such as coupling members. In some embodiments, the process detects positions of coupling members of toy construction elements of the real-world object and adds graphical representations of corresponding coupling members at corresponding positions of the visual representation.

The visual representation may be associated with a virtual object in a video game or other form of virtual environment. The various aspects described herein may be implemented with a variety of game systems or other computer-implemented entertainment, social or educational systems, e.g. systems including computer-generated virtual environments. Generally, a virtual object may represent a virtual character such as a human-like character, an animal-like character, a fantasy creature, etc. Alternatively, a virtual object may be an inanimate object, such as a building, a vehicle, a plant, a weapon, etc. In some embodiments, virtual objects whose counterparts in the real-world world are inanimate, e.g. a car, may be used as an animate virtual character in a virtual environment. Hence, in some embodiments the virtual object is a virtual character and, in some embodiments, the virtual object is an inanimate object. Accordingly, the process may comprise storing the virtual object so as to make the virtual object available in the virtual environment independently of the presence of the real-world object, or otherwise for subsequent retrieval, e.g. during a subsequent user session, subsequent to the user session during which the virtual object was created.

A virtual character may exhibit behaviour by moving around within the virtual environment, by interacting with or generally engaging other virtual characters and/or with inanimate virtual objects present in the virtual environment and/or with the virtual environment itself and/or by otherwise evolving within the virtual environment, e.g. growing, aging, developing or loosing capabilities, attributes or the like. Generally, virtual objects have attributes, e.g. one or more capabilities, that influence the game play or other evolution of a virtual environment. For example, a car may have a certain maximum speed, or an object may have an attribute that determines whether or how a virtual character may interact with the virtual object, and/or the like.

To this end, the process comprises assigning one or more virtual attributes, e.g. behavioural attributes such as capabilities, needs, preferences or other attributes of the virtual object, or other game-related attributes to a virtual object. While at least one of the virtual attributes is at least in part based on one or more properties of an entity different from the real-world object, some or all attributes may at least partly be based on detected visual characteristics of the real-world object, e.g. by using a mechanism as disclosed in international patent application PCT/EP2015/062381.

An attribute may be a global attribute indicative of a characteristic of the virtual object as a whole or a local attribute that is associated with a part of the virtual object, e.g. with a location relative to the visual representation of the virtual object, e.g. a location on a surface of the virtual object. For example, the process may create functional elements of a virtual object such as movable parts, parts that can be user-controlled, parts that can change appearance, parts that can interact with other virtual objects or with the virtual environment, etc. or that have other forms of functional attributes associated with them.

The attributes assigned to the virtual object may include one or more global attributes indicative of a property of the virtual object as a whole. Examples of global attributes may include one or more of the following: attributes indicative of a capability or skill, attributes indicative of an energy level, attributes indicative of a global behaviour of the object, and/or the like. Yet further examples of global attributes include an ability to move, e.g. an ability to fly or to move across a surface, a speed and/or mode of movement, etc. Other examples of attributes include local attributes that are associated with respective parts of the virtual object rather than with the virtual object as a whole. For example, local attributes may be indicative of a functional capability of a part of the object, e.g. an attribute indicative of a capability of a part of the virtual object to be moved relative to the remainder of the virtual object or relative to another part of the virtual object. Other examples of local attributes may be indicative of a capability of a part of the virtual object to discharge one or more virtual discharge elements, such as virtual projectiles, virtual light beams, virtual fluids and/or other virtual effects. Yet further examples of local attributes may include a capability of a part of the virtual object to interact with other virtual objects, e.g. to establish a connection, to exchange virtual elements, and/or the like. Generally, local attributes include functional/behavioural attributes that represent a function/behaviour different from static attributes like color, texture, etc that do not change.

At least one of the virtual attributes assigned to the created virtual object is at least in part based on one or more properties of an entity different from the real-world object. The entity may be internal to the data processing system executing the process or it may be an external entity, different from the data processing system. The property of the entity may be detected by the data processing system executing the process or it may be detected by an external detection device, different from the data processing system. The entity may be a physical entity or a virtual entity, e.g. a virtual entity of the game or virtual environment. The property may be the identity of the entity, a visible or otherwise detectable quality or measurable quantity of the entity, information stored by the entity, etc.

In some embodiments, the detection device is an electronic device. Accordingly, the process obtains an input from an electronic device which may be a part of or communicatively connectable with the data processing system and the input may be indicative of a current operational state of the electronic device, an input received by the electronic device or another property of the electronic device. The electronic device may be a game controller and the input may be indicative of an input received by the game controller, in particular an input different from a selection of a user selection of an attribute from a list or menu of available attributes. In another example, the electronic device comprises a sensor and the input is indicative of quantity sensed by the sensor, e.g. a quantity indicative of a property of the device itself, a property of an environment of the device, or a property of an object separate from the device.

In some embodiments, the process obtains an input from a data processing system executing a digital game and the input may be indicative a current state of the digital game, e.g. game session data. The data processing system executing the digital game may be the same data processing system that performs the process disclosed herein or a different data processing system. In particular, the digital game may comprise the virtual environment and the process may create the virtual object in the virtual environment of the digital game. For example, a user may have been engaged in a digital game for a while using an existing virtual character. The player then scans a real-world object (e.g. a toy construction model constructed by the user) so as to cause the system to create a new virtual object. The process may then assign one or more properties (e.g. experience points, capabilities, etc.) from the existing character to the newly created virtual object. In another example, the process receives an input indicative of a current location within the virtual environment (e.g. a location where the player character of a digital game is currently located), and assigns one or more attributes to the created virtual object depending on the current location. For example, some attributes may be only available at certain game locations or at certain game states.

In some embodiments, the process obtains an input indicative of one or more properties of another virtual object, i.e. the entity is another virtual object. Accordingly, the assigned attribute may be a relationship between the created virtual object and the other virtual object, e.g. a membership of the same team or an opposite team. Other examples include the created virtual object inheriting one or more attributes from another virtual object, e.g. a previously created virtual object. In yet another example, the assigned attribute defines an interaction of the created virtual object and the other virtual object, e.g. how the virtual object can be interconnected or otherwise be combined so as to form a combined virtual object. This interaction may thus also depend on a property (e.g. the shape or connectivity properties) of the other virtual object.

In some embodiments, the other virtual object is a virtual object created based on another obtained digital representation of another real-world object, the other digital representation representing a visual appearance of a shape of the other real-world object. Alternatively, the other virtual object may be any other, e.g. pre-existing, virtual object that is already available in the virtual environment when the new virtual object is created.

In some embodiments, the method comprises:
    obtaining a first digital representation of a first real-world object;
    obtaining a second digital representation of a second real-world object;

creating a virtual object, at least a part of the virtual object having a visual appearance of a likeness of the second real-world object;

assigning an attribute to virtual object; wherein the attribute is determined at least in part based on the obtained first digital representation.

One or each of the first and second real-world objects may be a respective toy construction model being constructed from respective pluralities of toy construction elements, each toy construction element comprising one or more coupling members configured for detachably interconnecting the toy construction elements with each other. One or both of the obtained digital representations may be indicative of a visual appearance of the respective real-world objects. The created virtual object may have a visual appearance of a likeness of the second real-world object or of a combination of the first and second real-world objects, e.g. of a combined toy construction model constructed by attaching the first and second real-world toy construction models to each other.

Accordingly, the user may define an appearance of a virtual object (or of a part thereof) based at least in part on one real-world object while defining one or more attributes of the virtual object based at least in part on another real-world object. This may in particular be useful when it is difficult to discern both the visual appearance and the attributes from the same real-world object, e.g. because a part of the virtual object to which the attribute is to be assigned may be difficult to identify, e.g. because the part is obstructed from view by other parts of the virtual object.

For example, the attribute may include the identification of one or more joints or otherwise of parts of a toy construction model that are movable relative to each other or that are operable to perform another function. These parts may be more easily identifiable in a partial toy construction model where not all toy construction elements have yet been added. Accordingly, assigning an attribute may comprise:

detecting at least one part of the first real-world toy construction model that is operable to perform a function and, optionally, detection said function.

determine a corresponding part of the created virtual object; and assigning a virtual function to the determined corresponding part based on the detected at least one part of the first real-world toy construction model.

In particular, in some embodiments, assigning an attribute may comprise:

detecting at least two parts of the first real-world toy construction model that are movable relative to each other;

determining corresponding two parts in the created virtual object; and representing a movement of the determined corresponding two parts relative to each other based on the detected at least two parts of the first real-world toy construction model.

The first toy construction model may be a skeleton or otherwise a partial model that includes functional or movable parts such that they are clearly visible and, thus, clearly identifiable in a corresponding digital representation of the model. The second toy construction model may comprise the first toy construction model as a sub-model and additional toy construction elements connected to the first toy construction model. Assigning the movable parts to the virtual object created from the second toy construction model may thus be performed based on the information obtained from the digital representation of the first toy construction model.

In another embodiment, the attribute is indicative of at least a first and a second state of the virtual object; and wherein the method comprises:

representing at least a first and a second state of the virtual object; wherein the first state is based on the obtained first digital representation and the second state is based on the obtained second digital representation.

For example, the real-world object (e.g. the real-world toy construction model) may be transformed between one visual appearance and a second visual appearance, e.g. by moving movable parts relative to each other, by repositioning toy construction elements and/or by replacing, adding and/or removing toy construction elements. The created virtual object may thus also be rendered or otherwise represented in two or more states, e.g. standing and flying, or collapsed and expanded, or happy and angry, etc. One of the states may be represented by the visual appearance of the second real-world object and another state may be represented by the first real-world object. Accordingly the assigned attribute may represent an alternative appearance of the virtual object. It will be appreciated that the alternative appearance may also be associated with alternative or additional capabilities or other characteristics of the virtual object, e.g. the capability to fly, an increased strength, etc. It will be appreciated that the process may comprise associating more than two states to a virtual object, e.g. by obtaining digital representations of more than two real-world objects. Alternatively or additionally, the process may include representing intermediate states e.g. transitional states illustrating a transformation or transition between the first and the second state. The transformation or transition between the states may be triggered by a game event, e.g. by a user input.

In some embodiments, the attribute is indicative of a function or capability of the virtual object or a part thereof.

In some embodiments, the attribute is indicative of a visual appearance of the virtual object; and the method comprises representing the virtual object as a combined virtual object, combined from a first object part resembling the first real-world object and a second object part resembling the second real-world object.

Accordingly the user may construct a virtual object from individual part objects where the user separately obtains respective digital representations of each of the part objects. It will be appreciated that the user may create respective virtual objects from the respective real-world objects and the combine them in the virtual environment, e.g. responsive to a user input or other game event.

In particular, in some embodiments, the first and second real-world objects are toy construction models and the method comprises:

detecting, based on the obtained first digital representation; a first connection element of the first real-world toy construction model;

detecting, based on the obtained second digital representation; a second connection element of the second real-world toy construction model, the second connection element being able to engage the first connection element so as to interconnect the first and second real-world toy construction models with each other;

representing the virtual object as a combined virtual object, combined from a first object part resembling the first real-world toy construction model and a second object part resembling the second real-world toy construction model; wherein the first and second object parts are interconnected at respective first and second virtual connection elements corresponding the respective first and second connection elements of the first and second real-world toy construction models.

Accordingly, the process may detect parts of the respective virtual objects where the virtual objects can be connected to each other. Optionally, the process may also detect a type of connection that a detected connection element provides, e.g. a rigid connection, a hinged connection, a rotatable connection or otherwise movable connection, etc.

The connection elements may comprise coupling members of the toy construction elements or a predetermined subset of detectable coupling members or a predetermined subset of toy construction elements that are detectable as connection elements.

Generally, the coupling members of the toy construction elements may utilise any suitable mechanism for releasably connecting construction elements with other construction elements. In some embodiments, the coupling members comprise one or more protrusions and one or more cavities, each cavity being adapted to receive at least one of the protrusions in a frictional engagement.

In some embodiments, the toy construction elements may adhere to a set of constraints, e.g. as regards to their shapes and size and/or as regards the positions and orientations of the coupling members and to the coupling mechanism employed by the coupling members. In some embodiments, at least some of the coupling members are adapted to define a direction of connection and to allow interconnection of each construction element with another construction element in a discrete number of predetermined relative orientations relative to the construction element. Consequently, a large variety of possible building options are available while ensuring interconnectivity of the building elements. The coupling members may be positioned on grid points of a regular grid, and the dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension. Coupling members consistent with the toy construction system thus adhere to the connectivity rules imposed by the toy construction system, e.g. including the type, position and/or orientation of the coupling members, and they are configured to engage mating coupling elements of one or more of the toy construction elements of the toy construction system.

Accordingly, the first and/or second connection elements may be individual coupling members of the toy construction system or combinations of coupling members, e.g. a grid of coupling members, a grid of coupling members of a predetermined shape and/or size and/or the like.

According to some embodiments, the second plurality of toy construction elements includes the first plurality of toy construction elements optionally even as a coherent substructure formed by the first toy construction model. In some embodiments, the first and second plurality of toy construction elements are the same while in other embodiments, the first plurality is a true subset of the second plurality. In yet alternative embodiments, the first plurality only comprises some or even no toy construction elements that are also present in the second plurality of toy construction elements.

Generally, the assigned attribute may be selected automatically, manually by a user or semi-automatic, e.g. in a user-assisted manner. For example, the process may automatically determine a set of possible attributes based at least in part on a property of an entity different than the real-world object and allow a user to select one of the determined set of possible attributes.

According to some embodiments, the method comprises:
selecting a part of the virtual object; and
assigning one or more local attributes to the selected part of the virtual object.

The part of the virtual object to which a local attribute is assigned may be identifiable as a part of visual representation of the virtual object. For example, in embodiments where the visual representation of the virtual object comprises a plurality of geometry elements, e.g. a plurality of surface elements of a mesh representing a surface of the virtual object or a plurality of voxels of a volume representation of the virtual object, the selected part may comprise a selected subset of the geometry elements.

Selecting a part of the virtual object may be performed automatically, e.g. based on one or more detected features of the virtual object, or user-assisted, e.g. at least partly responsive to a user input.

In some embodiments, selecting a part of the virtual object comprises detecting, based on the visual representation of the virtual object, a predetermined feature of the virtual object, such as a geometric feature. The geometric feature may e.g. be a predetermined geometric shape, such as a circle, an ellipse, a polygon or the like. In some embodiments, the detection of a feature may comprise recognition of one or more object components. For example, in embodiments where the real-world object is a real-world toy construction model constructed from individual toy construction elements, the detected feature may be one or more recognised toy construction elements that are part of the real-world toy construction model.

In some embodiments, the user may indicate a portion of the virtual object and the process may then detect a predetermined feature within the user-selected portion. The process may then select a part of the virtual object based on the detected feature. For example, the process may select the detected feature as the selected part or the process may select a part of the virtual object in a proximity of the detected feature as the selected part. Generally, a user may indicate a portion of the virtual object in a number of ways. For example, a user may indicate, e.g. using a pointing device or another pointing mechanism, a contour of a region within a representation of the virtual model on a display. Alternatively, the user may point to a location on the surface of the virtual surface, and the process may determine a part of the virtual object as a part having one or more properties in common with the user-selected location, e.g. the same color, texture, etc. Alternatively or additionally, the process may use one or more object segmentation techniques to segment the virtual model into a number of segments. The process may then allow the user to select one or more of the segments.

In some embodiments, the process may detect multiple candidate features. The process may then indicate the detected candidate features and allow a user to select one or more of the detected candidate features. The process may then determine the selected part based on the user-selected candidate feature.

The selection of the local attribute may at least in part be based on one or more characteristics of the part of the virtual object to which the local attribute is assigned and/or on one or more characteristics of another part of the virtual object. For example the type of local attribute or one or more characteristics of the local attribute may be selected based on one or more characteristics of the part of the virtual object and/or of another part of the virtual object. The characteristics of the part of the virtual object or of another part of the virtual object may include a color, a size, a shape or one or more other detectable characteristics. Characteristics of the local attribute may include a strength, a level, or another property of the attribute. One or more local attributes may at least in part be based on the property of the entity other than the real-world object. Generally, it will be appreciated that not all attributes assigned to the virtual object need to be determined based on a property of an entity other than the real-world object. Some attributes may indeed be based entirely on properties of the real-world object and/or on a specific user selection.

Accordingly, in some embodiments, assigning one or more local attributes to the selected part of the virtual object comprises:
  detecting one or more properties of the selected part and/or of one or more other parts of the virtual object, different from the selected part and/or of an entity other than the real-world object; and
  selecting the one or more local attributes at least in part based on the detected one or more properties of the selected part and/or of one or more other parts of the virtual object and/or of an entity other than the real-world object.

Each of the detected one or more properties may be a visual property of a real-world object that can be attained by sight, e.g. a property that can be derived from a color and/or a shape and/or a size of the real-world object.

For example, when a selected part has been assigned a capability of discharging a discharge element, the process may select a discharge element to be discharged from the selected part based on a property of another part of the virtual object, e.g. based on a color of a portion of the virtual object in a proximity of the selected part. For example, a red color may result in the discharge element being fire while a blue color may result in the discharge element being water. Alternatively or additionally, the process may select the discharge element based on a property of the selected part. For example, the process may select a shape and/or size of the discharged object based on one or more determined properties of the selected part, e.g. based on a shape of the selected part that has been assigned the capability to discharge a discharge element. For example, the shape and/or size of the discharge element may be selected based on the shape and/or size of an opening from which the discharge element is to be discharged.

Generally, in some embodiments, one or more other attributes may be selected based on a property of the selected part and/or based on a property of another part of the virtual object. Examples of other attributes may include a degree of a function, e.g. an amount of discharge elements to be discharge, a discharge speed, a repetition rate, and/or the like.

In some embodiments, the assigned local attribute has an associated attribute direction and the method further comprises:
  determining a direction associated with the selected part of the virtual object; and
  assigning the determined direction as an attribute direction to the assigned local attribute.

For example, the local attribute may be a movement and the attribute direction may be a direction of the movement. Alternatively, the local attribute may be a rotation of a part of the virtual object and the attribute direction may be a direction of the axis of rotation. Yet alternatively, the local attribute may be a discharge capability of discharging one or more discharge elements from a part of the virtual object, and the attribute direction may be a direction along which the discharge element is discharged.

The direction associated with the selected part may e.g. be determined as a surface normal of a surface location of the predetermined part, e.g. a surface normal at a centre, e.g. a geometric center, of the surface of the selected part. Alternatively, the direction of the part may be determined using another mechanism, e.g. by detecting one or more edges of the selected part and detecting a direction of the one or more edges. In yet another alternative embodiment, the direction may be detected from one or more detected features. For example, the process may detect an ellipse in a view of the virtual object and detect the direction from the major and minor axes of the ellipse, e.g. such that the direction is a normal direction from a center of a circular disc that results in an ellipse when viewed from said viewpoint.

In some embodiments, the virtual object is a vehicle operable by a virtual character or a creature on which a virtual character can ride; the assigned local attribute is a riding position of the virtual character relative to the virtual object; and the method comprises:
  determining a surface normal of a surface of the virtual object at a selected riding position; and
  determining a riding posture of the virtual character based on the determined surface normal.

In some embodiments, the process allows a user to indicate the riding position. During the selection process the process may animate a virtual character to climb on top of the virtual object towards the indicated riding position. To this end, the process may use the surface normal of the digital representation of the virtual object to determine the orientation of the virtual character while climbing towards the riding position.

In some embodiments, selecting a part of the virtual object comprises:
  recognising a part of the virtual object as a representation of a recognised one of a plurality of predetermined parts, the recognised part corresponding to a subset of said plurality of geometric elements; wherein digital representations of the plurality of predetermined parts are stored in a library of predetermined parts; wherein one or more of the digital representations of the predetermined parts have associated with them one or more predetermined attributes; and
  replacing the subset of geometric elements with the stored digital representation of the recognised predetermined part.

For example, the real-world object may be a toy construction model constructed from a plurality of construction elements and the process may have access to a library of virtual construction elements corresponding to the respective real-world construction elements. The toy construction elements may comprise coupling members for detachably interconnecting the toy construction elements with each other. The process may recognise one or more construction elements as being part of the real-world object. The process may then replace the corresponding part or parts of the virtual object that correspond to the recognised toy construction elements by the digital representation obtained from the repository. Accordingly, the virtual object may be represented based on a more accurate digital representation of the individual construction elements than may be achievable from a conventional 3D reconstruction pipeline. Moreover, some of the virtual construction elements may have predetermined functionalities associated with them. For example, a wheel may be animated to rotate, a door may be animated to be opened, a fire hose may be animated to eject water, a canon may be animated to discharge projectiles, etc.

A user may thus create a real-world toy construction model resembling an object to be used as a virtual object in a computer-generated virtual environment. As the user may construct these objects from toy construction elements, the user has a large degree of freedom as to how the object is constructed. Moreover, the system provides the user with a flexible, yet easy-to understand and easy-to use mechanism for influencing the desired behaviour or other attributes of the virtual object in the virtual environment, e.g. behavioural attributes such as capabilities, needs, preferences or other attributes of the virtual object, or other game-related attributes of a virtual object.

Alternatively or additionally to replacing a subset of geometric elements with the stored digital representation of a recognised predetermined part, the process may utilise the recognition of a predetermined part in a different way. For example, based on the recognised part, the process may determine a relative scale, orientation, size and/or the like of the created virtual object within the virtual environment (e.g. relative to other elements near the created virtual object within the virtual environment).

The process may create a computer-generated virtual environment and simulate the evolution of the virtual environment over time, including the behaviour of one or more virtual characters and/or the attributes of one or more virtual objects within the virtual environment. For the purpose of the present description a computer-generated virtual environment may be persistent, i.e. it may continue to evolve and exist even when no user interacts with it, e.g. between user sessions. In alternative embodiments, the virtual environment may only evolve as long as a user interacts with it, e.g. only during an active user session. A virtual object may be at least partly user-controlled, i.e. the data processing system may control the behaviour of a virtual object at least partly based on received user inputs. A computer-generated virtual environment may be a single-user environment or a multi-user environment. In a multi-user environment more than one user may interact with the virtual environment concurrently, e.g. by controlling respective virtual characters or other virtual objects in the virtual environment. Computer-generated virtual environments and, in particular, persistent, multi-user environments are sometimes also referred to as virtual worlds. Computer-generated virtual environments are frequently used in game systems, where a user may control one or more virtual characters within the virtual environment. A virtual character controlled by the user is sometimes also referred to as "the player." It will be appreciated that at least some embodiments of the aspects described herein may also be used in contexts other than game play. Examples of computer-generated virtual environments may include but are not limited to videogames, e.g. games of skill, adventure games, action games, real-time strategy games, role play games, simulation games, etc. or combinations thereof. Some virtual environments may be elaborate with many virtual objects, virtual landscapes, virtual structures, etc. while other virtual environments may be relatively simple environments, e.g. merely defining a 2D or 3D space into which a virtual object can be inserted and, optionally move around, rotate, etc. Further examples of virtual environments include a model viewer that allows a user to view and/or explore a virtual object such as a virtual toy construction model, e.g. in a virtual 3D space. In some embodiments, the method may comprise communicating a representation of the created virtual model, optionally including data indicative of the assigned attribute(s) to another data processing system so as to allow the other data processing system to include into a virtual environment. In some embodiments the other data processing system may assign one or more (further) attributes to the virtual object. Thus created virtual objects may e.g. be shared via social media, messages and/or other communication channels and viewed or used by the recipient, optionally including the associated attributes, such as its functional or other capabilities.

The present disclosure relates to different aspects including the method described above and in the following, corresponding apparatus, systems, methods, and/or products, each yielding one or more of the benefits and advantages described in connection with the first mentioned aspect, and each having one or more embodiments corresponding to the embodiments described in connection with the first mentioned aspect and/or disclosed in the appended claims.

In particular, the present disclosure further relates to a computer-implemented method for creating a virtual object; the method comprising:
- obtaining a digital representation of a real-world object, the digital representation representing a visual appearance of a shape of the real-world object;
- detecting, from the received digital representation, one or more properties of the real-world object;
- creating a virtual object in a virtual environment, the virtual object representing the real-world object; and
- assigning, based on the detected one or more properties, an attribute to the virtual environment.

The present disclosure further relates to a data processing system configured to perform the steps of an embodiment of one or more of the methods disclosed herein. To this end, the data processing system may comprise or be connectable to a computer-readable medium from which a computer program can be loaded into a processor, such as a CPU, of the data processing system for execution. The computer-readable medium may thus have stored thereon program code means adapted to cause, when executed on the data processing system, the data processing system to perform the steps of the method described herein. The data processing system may comprise a suitably programmed computer such as a portable computer, a tablet computer, a smartphone, a PDA or another programmable computing device having a graphical user-interface. In some embodiments, the data processing system may include a client system and a host system. The client system may comprise a camera or other sensor device and a user interface; the host system may be configured to create and control a virtual environment. The client and the host system may be connected via a suitable communications network such as the internet.

Generally, here and in the following the term processor is intended to comprise any circuit and/or device and/or system suitably adapted to perform the functions described herein. In particular, the above term comprises general- or special-purpose programmable microprocessors, such as a central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. The processor may be implemented as a plurality of processing units.

Some embodiments of the data processing system include a sensor device such as an image capture device, e.g. a camera, e.g. a video camera, or any other suitable device for obtaining one or more images of a toy construction model or other real-world object. Other embodiments may be configured to generate a digital representation of the real-world object and/or retrieve a previously generated digital representation.

The sensor device may comprise a radiation source operable to direct radiation towards the toy construction model. For example, an image capture device may comprise a flash-light, one or more LEDs, a laser, and/or the like. Alternatively, the image capture device may be operable to detect radiation reflected by the object. Here, the term reflection is intended to refer to any type of passive emission responsive to received radiation or waves, including diffuse reflection, refraction, etc. Embodiments of the data processing system may include a display or other output device for presenting the virtual environment to a user. Embodiments of the data processing system may also comprise a scanning station, e.g. including the sensor device and an object support such as a turntable.

The present disclosure further relates to a computer program product comprising program code means adapted to cause, when executed on a data processing system, said data processing system to perform the steps of one or more of the methods described herein.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a mobile device from an App store.

The present disclosure further relates to a toy construction system that comprises a data processing system as described above and a plurality of toy construction elements as described herein. The data processing system may include a processor; the data processing system may further comprise an image capture device and a display or other output device.

The present disclosure further relates to a toy construction set comprising a plurality of toy construction elements, and instructions to obtain a computer program computer program code that causes a data processing system to carry out the steps of an embodiment of one or more of the methods described herein, when the computer program code is executed by the data processing system. For example, the instructions may be provide in the form of an internet address, a reference to an App store, or the like. The toy construction set may even comprise a computer-readable medium having stored thereon such as computer program code. Such a toy construction set may even comprise a camera or other image capture device connectable to a data processing system. Optionally, the toy construction set may further include a scanning station, a sensor device or both.

Embodiments of the toy construction system allow a user to construct a large variety of toy construction models in a uniform and well-structured manner and with a limited set of different toy construction elements. For example, a toy construction system may be provided as a toy construction set comprising a number of toy construction elements. The user may also create a large variety of virtual objects which exhibit a large variety of behavioural attributes in a virtual environment.

DETAILED DESCRIPTION

Various aspects and embodiments of methods, apparatus and toy construction systems disclosed herein will now be described with reference to toy construction elements in the form of bricks, e.g. in the form of toy construction elements available under the name of LEGO. However, the invention may be applied to other forms of toy construction elements for use in toy construction sets.

Figure 1:
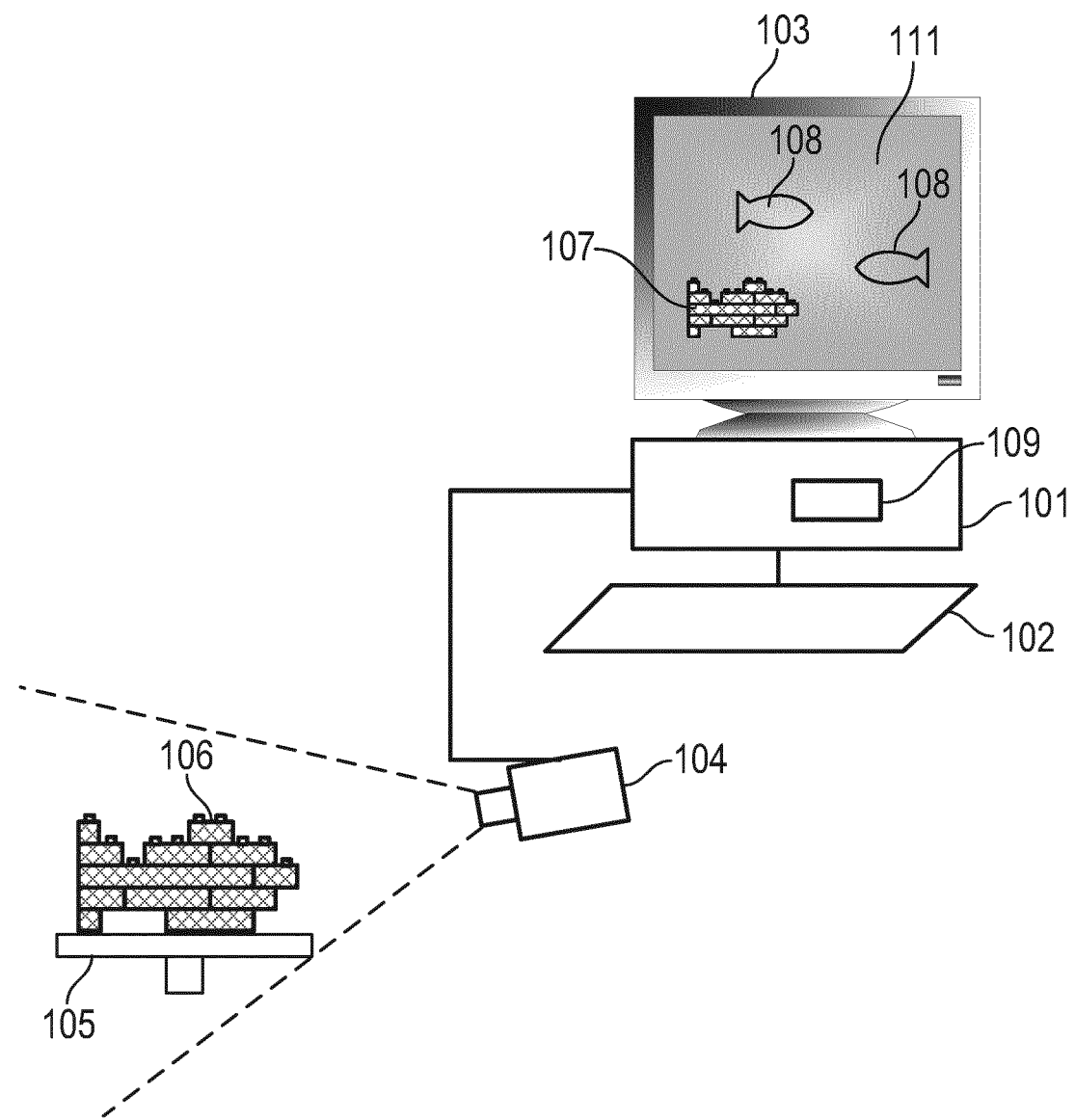
FIG. 1 schematically illustrates an embodiment of a system for creating a virtual object.

FIG. 1 shows an embodiment of a toy construction system. The system comprises a computer 101 or other data processing system, an input device 102, a display 103, a sensor device comprising a camera 104, an object support comprising a turntable 105, and a toy construction model 106 constructed from one or more toy construction elements of the toy construction system.

The computer 101 may be a personal computer, a desktop computer, a laptop computer, a handheld computer such as a tablet computer, a smartphone or the like, a game console, a handheld entertainment device, or any other suitably programmable computer. The computer 101 comprises a processor 109 such as a Central Processing Unit (CPU) and one or more storage devices such as a memory, a hard disk, and/or the like.

The display 103 is operatively coupled to the computer 101 and the computer 101 is configured to present a graphical representation of a virtual environment 111 on the display 103. Though illustrated as separate functional blocks in FIG. 1, it will be appreciated that the display may be integrated in the housing of the computer.

The input device 102 is operatively coupled to the computer 101 and is configured to receive user inputs. For example, the input device may comprise a keyboard, a game controller, a mouse or other pointing device, and/or the like. In some embodiments, the system comprises more than one input device. In some embodiments an input device may be integrated in the computer and/or the display, e.g. in the form of a touch screen. It will be appreciated that the system may comprise further peripheral devices operatively coupled to, such as integrated into, the computer.

The camera 104 is operable to capture images of the toy construction model 106 and to forward the captured images to the computer 101. To this end, a user may position the toy construction model 106 on the turntable 105. In some embodiments, the user may construct the toy construction model on top of a base plate. The camera may be a digital camera operable to take digital pictures, e.g. in the form of a two-dimensional array of pixels. In particular, the camera may be configured to capture light intensities for each pixel and additional information such as polarisation information and/or a direction of a surface normal for each pixel or for groups of pixels.

Alternatively other types of sensor devices, e.g. other types of image capture devices may be used. Also, in alternative embodiments, the system does not use a turntable.

The display 103, the camera 104 and the input device 102 may be operationally coupled to the computer in a variety of ways. For example one or more of the above devices may be coupled to the computer via a suitable wired or wireless input interface of the computer 101, e.g. via a serial or parallel port of the computer such as a USB port, via Bluetooth, Wifi or another suitable wireless communications interface. Alternative, one or all of the devices may be integrated into the computer. For example, the computer may comprise an integrated display and/or input device and/or an integrated camera. In particular, many tablet computers and smartphones comprise an integrated camera, an integrated touch screen operable as a display and input device.

The computer 101 has stored thereon a program, e.g. an App or other software application, adapted to create and control a virtual environment, to process captured images and to create virtual objects as described herein. For example the virtual environment may be a part of a computer game.

It will be appreciated that, in some embodiments, the computer 101 may be communicatively connected to a host system, e.g. via the Internet or another suitable computer network. At least a part of the processing described herein may then be performed by the host system. For example, in some embodiments, a host system may generate and simulate a virtual environment, such as a virtual world which may be accessible by multiple users from respective client computers. A user may use a client computer executing a suitable program to capture an image. The captured images may be processed by the client computer or uploaded to the host system for processing and creation of a corresponding virtual object. The host system may then add the virtual object to the virtual world and control the virtual object within the virtual world as described herein.

In the example of FIG. 1, the virtual environment 111 is an underwater environment such as a virtual aquarium or other underwater environment.

The virtual objects 107, 108 resemble fish or other underwater animals or creatures. However, it will be appreciated that other types of virtual environments may be implemented where the virtual objects represent other types of virtual objects, such as other types of virtual characters, animals, creatures, vehicles, accessories, tools, etc.

In the example of FIG. 1, the computer has created one virtual object 107 based on captured images of the toy construction model 106. The computer has created the virtual object 107 so as to resemble the toy construction model, e.g. by creating a 3D mesh or another suitable form of representation. In the example of FIG. 1, the virtual object 107 resembles the shape and color of the toy construction model 106. In the present example, the virtual object even resembles the individual toy construction elements from which the toy construction model 106 has been constructed. It will be appreciated, however, that different levels of resemblance may be implemented. For example, in some embodiments, the virtual object may be created so as to resemble only the overall shape of the construction model without simulating its internal structure of individual toy construction elements. The virtual object may also be created to have a size corresponding to the size of the virtual construction element, e.g. by providing a reference length scale on the turntable 105 so as to allow the computer to determine the actual size of the toy construction model. Alternatively, the computer may use the size of the toy construction elements as a reference length scale. In yet alternative embodiments, the user may manually scale the size of the virtual object.

The system illustrated in FIG. 1 is configured to create or otherwise obtain a 3D or other digital representation of a real-world object which may then be used to create a virtual object or character, e.g. as described in more detail below. The system is further operable to obtain an input indicative of one or more properties of an entity different from the real-world object and to assign, based on at least the obtained input, an attribute to the created virtual object, e.g. as described in more detail below.

Figure 2:
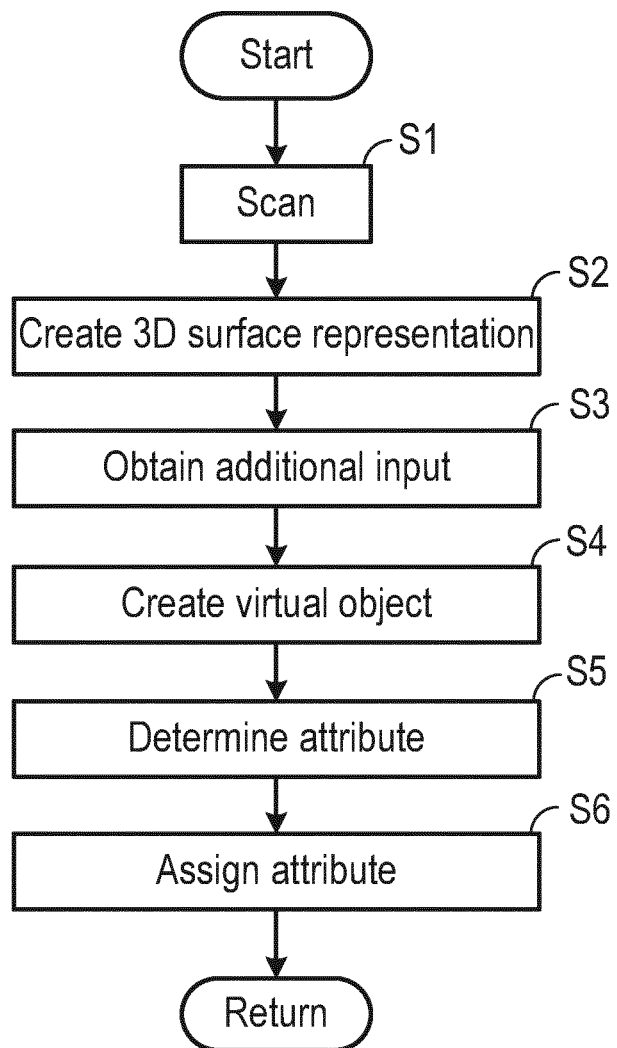
FIG. 2 shows a flowchart of an embodiment of a process described herein.

FIG. 2 shows a flowchart of an embodiment of a process described herein. For example, the process may be performed by one of the systems described in FIGS. 1 and 7-9 or by another suitably programmed data processing system.

In an initial step S1, the process obtains data indicative of the visual appearance of a toy construction model or of another real-world object. For example, the process may capture a plurality of digital images of a toy construction model at respective angular positions of a turntable on which the toy construction model is positioned, or otherwise from respective viewpoints. The data may include digital images and/or a depth map and/or another form of data representing the visual appearance of the object, e.g. the surface texture, color, shape, etc.

In subsequent step S2, the process constructs a 3D digital representation of the toy construction model from the obtained data, e.g. from the digital images. To this end, the process may perform one or more image processing steps known per se in the art of digital image processing. For example the processing may comprise one or more of the following steps: background detection, edge detection, color calibration, color detection.

A process for generating a 3D digital representation of a real-world object from a plurality of captured images may employ any suitable technique known as such in the art of object reconstruction. For example, in one embodiment, the captured images are processed in order to extract:

information about the real-world scene as seen through the camera, a turntable position or camera viewpoint relative to the object, and an object silhouette.

In a subsequent step, the obtained silhouettes may be projected onto a voxelized volume that is carved accordingly. Subsequently, a marching cube algorithm is applied to the 3D object obtained from carving. The final mesh is then obtained and the textures cut out from the camera frames are applied on top of that. The process may result in a mesh representation of the surface of the object, e.g. using triangles of other polygons. Alternatively, the process may result in a voxel representation of the object.

In step S3, the process obtains an input indicative of one or more properties of an entity different from the real-world object. The entity may be a virtual entity, e.g. a previously created or otherwise already existing virtual object, a previously obtained or otherwise already existing digital representation of a real-world object, a data object indicative of a user profile, etc. Alternatively, the entity may be a physical entity, such as another real-world object, a user of the system, a hardware entity of the data processing system on which the process is executed, an external hardware entity of an external system, different from and external to the data processing system on which the process is executed, etc. The process may obtain the input via a communications interface, a peripheral device, a software module and/or the like.

In step S4, the process creates a virtual object. The virtual object has a visual appearance defined by the 3D representation created in the previous step or by another visual representation derived therefrom. In addition, the virtual object may comprise additional global attributes such as attributes defining behavioural characteristics of the virtual object and/or additional local attributes. These characteristics may define how the object (or a part thereof) moves, its capabilities and functions, etc.

It may be appreciated that, in some embodiments, step S4 may be performed prior to or concurrently with step S3.

In step S5, the process determines, based at least in part on the input received in step S3, one or more global and/or local attributes to be assigned to the virtual object.

In subsequent step S6, the process assigns the determined attribute to the virtual object or to a selected part of the virtual object. To this end, the process may set a corresponding attribute value associated with the virtual object or with a selected part of the object in the data structure representing the virtual object. It will be appreciated that some types of attributes may be represented by a single value while other types of attributes may have a more complex representation.

It will be appreciated that steps S5 and/or S6 may be performed concurrently with, or as part of step S4.

Generally, the assignment of local attributes may comprise selecting a part of the visual representation of the virtual object, e.g. a part of the 3D shape of the object. This step may be performed fully automatically or it may be user assisted. For example, a user may manipulate a representation of the virtual object so as to identify the part to be selected. Alternatively, the process may use an object segmentation technique and/or a feature detection technique and/or another suitable mechanism to identify a part of the virtual object. Examples of methods for selecting a part of a virtual object will be described in greater detail below. In some embodiments, the process may identify a number of candidate parts from which the user may select one or more parts. The selected part may be identified as such in a suitable data structure representing the virtual object, e.g. by identifying a plurality of mesh elements or voxels representing the selected part of the object.

The determination of a local attribute to be assigned to a selected part of the virtual object may be performed automatically or partly based on a user input. To this end, the user may select an attribute, e.g. from a list of available or determined attributes. Alternatively or additionally, the process may automatically determine an attribute to be assigned to the selected part—or at least one or more characteristics of the attribute. For example, the process may select an attribute based on the input received in step S3 and, optionally, based on a property of the selected part and/or based on a property of other parts of the virtual object. Yet alternatively, the process may determine a plurality of candidate attributes based at least in part on the input received in step S3, and the user may select an attribute from the determined candidate attributes.

It will be appreciated that more than one attribute may be assigned to a selected part of the object and that more than one part of the object may be selected and assigned a virtual attribute.

Figure 3:
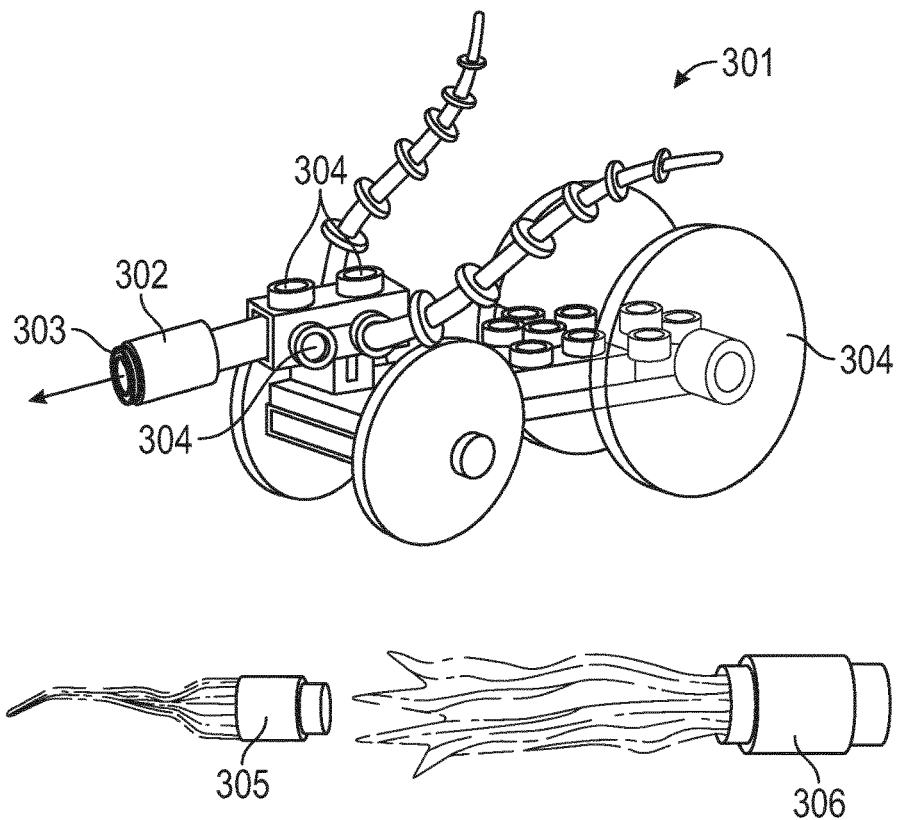
FIGS. 3-4 illustrate examples of a user-assisted selection of a part of a virtual object.
Figure 4:
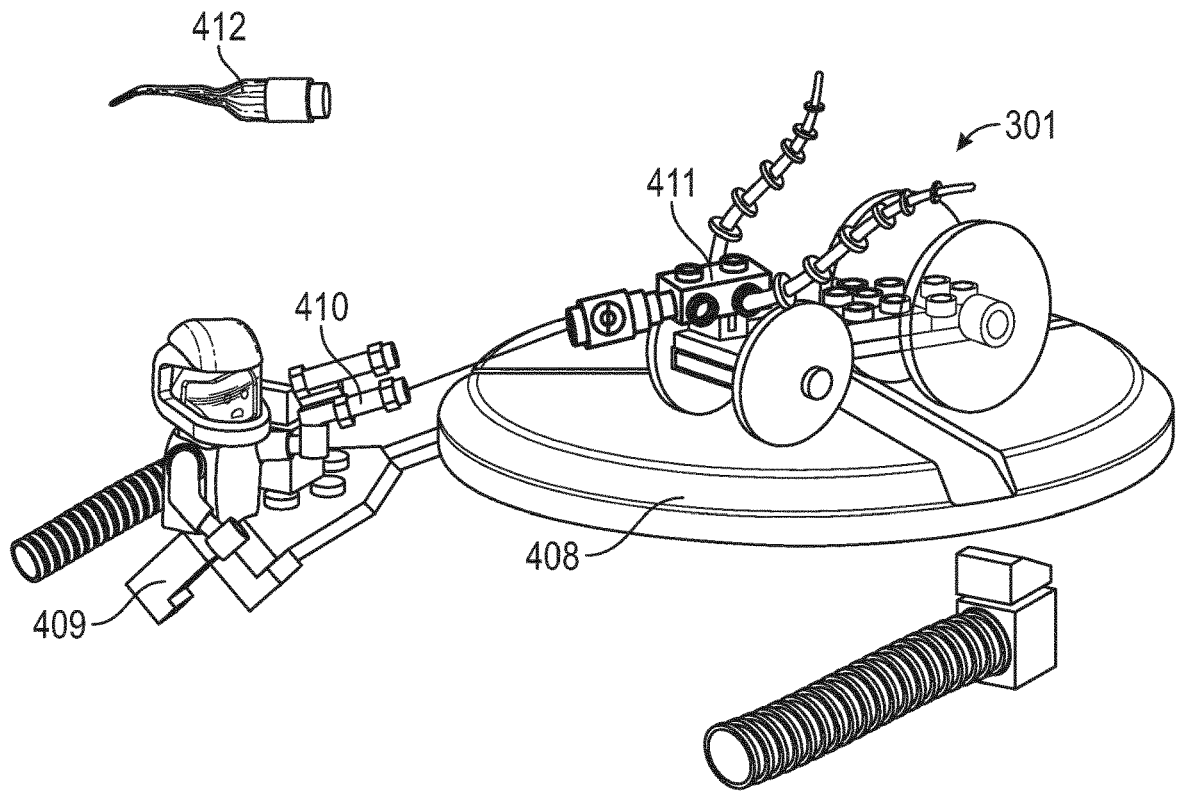

FIGS. 3-4 illustrate examples of a user-assisted selection of a part of a virtual object.

In particular, FIG. 3 illustrates a selection of a part of the object based on the detection of a predetermined feature. More specifically, in the present example, the process detects ellipses in a representation of the virtual object, e.g. in a 2D view of the virtual object. FIG. 3 shows a representation of a created virtual object 301 within a display area of a computer display, e.g. of the system of FIG. 1 or another suitably programmed processing device or system. In this example, the virtual object represents a vehicle that may be used by a virtual character in a computer game. The virtual object has been created based on a plurality of images taken from different viewpoints of a real-world vehicle constructed from toy construction elements, e.g. as described above.

The data processing system may provide functionality that allows the user to manipulate the view of the created virtual object 301, e.g. by rotating the object, by zooming, etc. The process may be configured to detect predetermined shapes, e.g. ellipses, polygons, etc. in the current view and highlight the detected shapes. To this end, the process may use any suitable method for the detection of predetermined features in images or 3D representations that are known as such in the art. In the example of FIG. 3, the process has detected an ellipse at the end of a tubular construction element 302. The process has highlighted the detected ellipse by drawing an emphasized ellipse 303 in a predetermined color, e.g. in red. It will be appreciated that the process may initially identify multiple features, e.g. additional ellipses 304. The process may then select one of the detected features, e.g. based on additional criteria, such as color, size, orientation, user input, etc.

The process may then assign an attribute to the selected feature 303 of the virtual object, e.g. automatically or by allowing the user to select a feature. In the example of FIG. 3, the process has selected a water gun functionality as an attribute to be assigned to the selected feature 302. The water gun functionality simulates the discharge of water from the detected ellipse. The process may allow the user to select one or more additional characteristics, e.g. the amount of water to be discharged, the speed or range of the discharged water, the direction of discharge, etc. In FIG. 3, this is illustrated by symbols 305 and 306 illustrating two available choices of water guns and allowing the user to select one type of water gun. Alternatively or additionally, the process may automatically determine one or more attribute characteristics of the assigned attribute. In particular, the process may determine such attribute characteristics based on an input indicative of one or more properties of an entity different from the real-world object from which the virtual object has been created. Optionally, the attribute characteristics may further be based on a detected property of the selected part and/or based on a property of other parts, e.g. neighbouring parts, of the virtual object.

For example, in the present example of a water gun, the color of the selected part may determine the color of the water of a water cannon attribute or another attribute of the discharged water, e.g. the virtual temperature of the discharged water which in turn may influence the effect the discharged water has on aspects of the game play. The size or shape of a selected part may determine the way a discharge element is discharged when a discharge attribute is assigned, e.g. the way the water sprays if a water cannon attribute is applied. As yet another example, a graphic marker of the real-world object and detected as part of the obtained digital representation may determine that the water is hot if a water cannon attribute is applied.

The water gun functionality is an example of an attribute that has a direction associated with it, namely in this case the direction along which the water is discharged. In FIG. 3, this direction is indicated by an arrow 307. The direction may be user-selectable or it may be determined automatically by the process, e.g. based on the orientation of the ellipse and based on the direction and size of the major and minor axes of the ellipse.

Generally, FIG. 3 illustrates an example of a user-assisted selection of a model feature where the process automatically detects one or more model features, and where the user manually selects one or more specific features to which a local attribute is to be assigned. Examples of detectable features include a color, a shape (e.g. circle, polygon, ellipse, etc.), a 3D geometric feature (e.g. a toy construction element), an edge, a face, a polygon, a material (e.g. rubber), a graphic asset/marker and/or the like.

FIG. 4 illustrates another example of a user-assisted selection process for selecting a part of the object based on the detection of a predetermined feature. In the example of FIG. 4, the process initially performs an object segmentation process, e.g. using a mesh segmentation algorithm or by detecting toy construction elements or other predetermined components of an object. The user may then identify one or more of the segments, e.g. by pointing at a segment or by selecting a color or other feature of a segment to be selected or the like. Examples of selectable features include a color, a shape (e.g. circle, polygon, ellipse, etc.), a 3D geometric feature (e.g. a toy construction element), an edge, a face, a polygon, a material (e.g. rubber), a graphic asset/marker and/or the like. The process then assigns an attribute to the selected segment of the virtual object, e.g. automatically or by allowing the user to select a feature, e.g. as described above.

More specifically, FIG. 4 shows a representation of a created virtual object 301 within a display area of a computer display, e.g. of the system of FIG. 1 or another suitably programmed processing device or system. In this example, the virtual object is represented as being positioned on a turntable 408 of a scanning station. The process shows a virtual character 409 that can be controlled by the user to walk around the virtual object 301 and to target respective parts of the virtual object with a targeting reticule 410, e.g. a pointer, cross hair or other aiming device. In the example of FIG. 4, the process has highlighted a segmented part 411 of the virtual object that is currently targeted by the virtual character 409. The user may now assign a user-selected or an automatically selected attribute, e.g. as illustrated by the functional feature 412 that may be assigned to the segment 411.

As mentioned above, the automatic segmentation may be based on a detection of individual toy construction elements or other components in the representation of the real-world object. To this end, the process may have access to a library of representations of a plurality of known toy construction elements or other known components. The known components may be stored as CAD files or as representations, e.g. as described in WO 2004/034333 or in another suitable form. Corresponding components of the virtual object may then be detected and recognised by a suitable object recognition process known as such in the art. The recognised components may then be user selectable such that attributes may be assigned to individual components or groups of components, e.g. to a subassembly of two or more toy construction elements, e.g. including animals, known figures, characters etc. or parts thereof, e.g. a torso part, a leg part, an engine part, a wheel, etc. In yet other embodiments, one or more parts of the virtual object may be detected and recognised based on known graphic assets/markers or the like.

Figure 5:
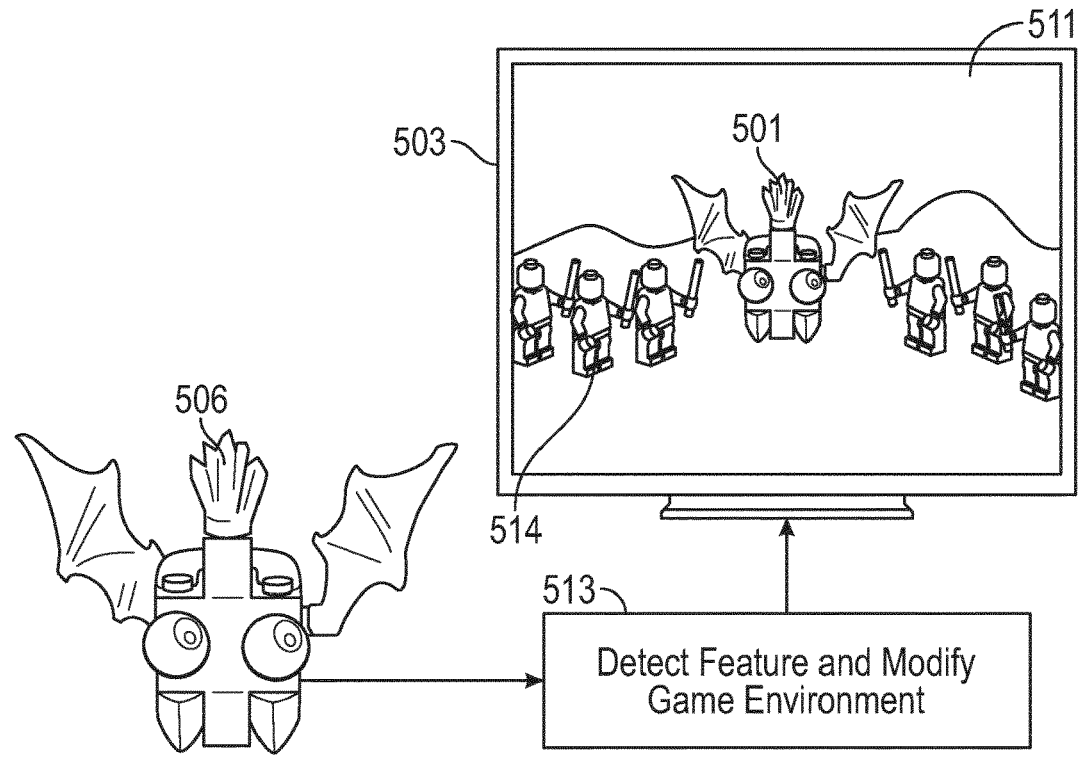
FIG. 5 illustrates an example of a process for creating a virtual object in a virtual environment based on a real-world object.

FIG. 5 illustrates an example of a process for creating a virtual object in a virtual environment based on a real-world object. The process may be performed by a system as described herein, e.g. with reference to any of FIGS. 1 and 7-9. The process initially obtains a digital representation of a real-world object 506, e.g. by performing steps S1 and S2 of the method described in connection with FIG. 2. The process further creates a virtual object 501 in a virtual environment 511 which is displayed on a display 503 of the system, e.g. as described in connection with step S4 of the method of FIG. 2. The process further detects (block 513) one or more features, e.g. visual characteristics of the real-world object and/or the digital representation thereof. Based on the detected feature(s), the process modifies the virtual environment into which the created virtual object is inserted. The model features may be detected automatically and the attributes may automatically be assigned to the game environment or in a user-assisted manner. The modification of the game environment may be performed instead of or in addition to an assignment of attributes to the virtual object as described herein.

Examples of model features may include one or more of the following: a color, an overall size of the real-world object, a detected graphic marker, a recognized object ID, a shape or form of the real-world object (e.g. long, tall, thin etc.), etc. The detected feature may e.g. be used to determine a type and/or number of virtual characters 514 (e.g. non-player characters) or objects (other than and in addition to the virtual object created based on the detected real-world object) to be spawned and/or to determine attributes or behavior of the spawned virtual characters or objects. Alternatively or additionally, the detected feature may be used to determine a theme of the virtual environment (e.g. jungle, desert, etc.) and/or granting access to a new part of the virtual environment.

For example, when the process detects a predominantly green car, the process may modify the game environment by spawning more jungle and/or virtual bugs may be attracted to the car and follow it around. In another example, detection of a big creature (e.g. comprising a large number/volume of toy construction elements) may cause the process to modify the game environment by sending armies of enemies to attack the newly created virtual object. In yet another example, detection of a real-world object with a graphic marker that identifies the real-world object may cause the process to modify the game environment by granting access to a new part of the game environment, e.g. by associating the game environment with a specific tribe of virtual creatures and open up the gates to their kingdom.

Figure 6:
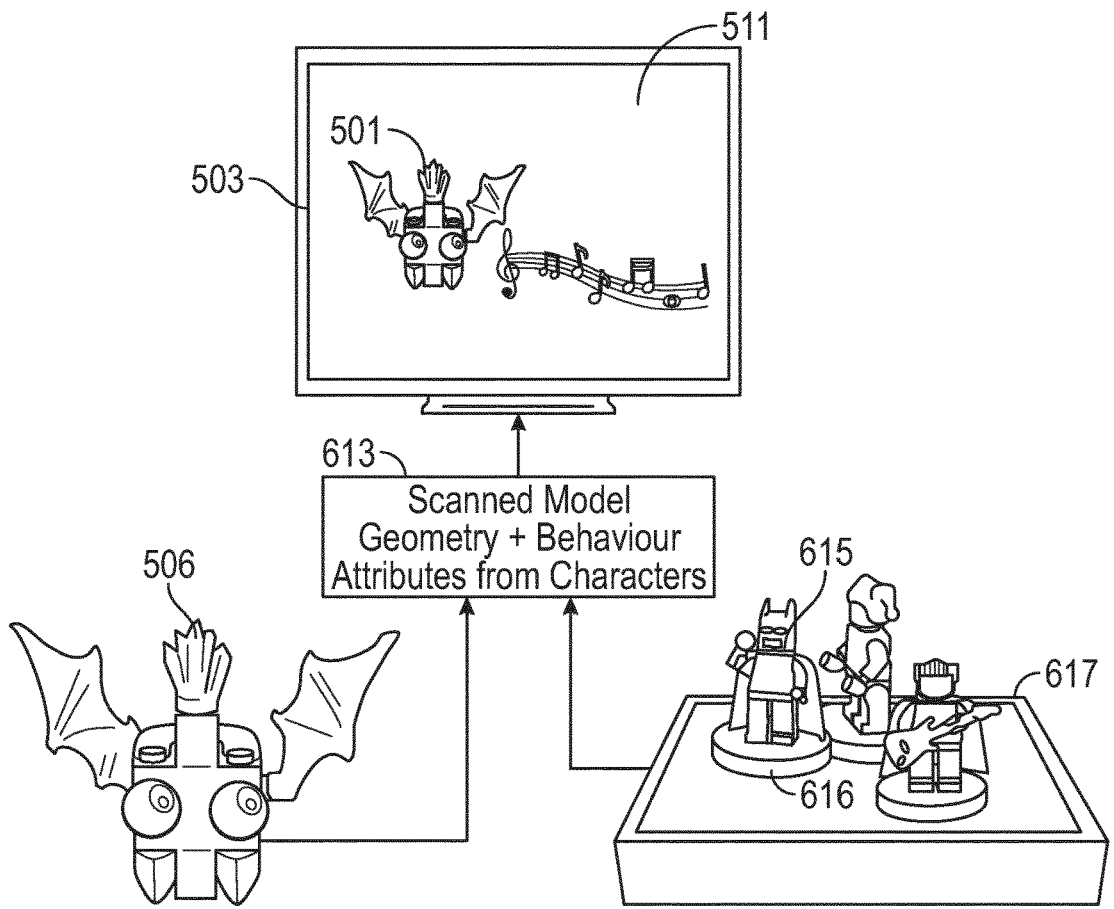
FIG. 6 illustrates an example of a process for creating a virtual object based on inputs from another detection device.

FIG. 6 illustrates an example of a process for creating a virtual object based on inputs from a detection device different from the sensor device which has obtained the input on which the digital representation of the real-world object is based. The process may be performed by a system as described herein, e.g. with reference to any of FIGS. 1 and 7-9. The process obtains a digital representation of a real-world object 506, e.g. by performing steps S1 and S2 of the method described in connection with FIG. 2. The process further creates a virtual object 501 in a virtual environment 511 which is displayed on a display 503 of the system, e.g. as described in connection with step S4 of the method of FIG. 2. The process further detects (block 613) one or more additional real-world objects 615 and, based on the identity and/or a detectable characteristic of the additional real-world objects, the process assigns one or more attributes, e.g. behavioural attributes to the created virtual object 501, e.g. as described in connection with steps S3, S5-S6 of FIG. 2.

The additional real-world objects may be detected concurrently with the obtaining of a digital representation; alternatively, the detection of the real-world objects may occur before or after the obtaining of the digital representation. The additional real-world objects may be detected by any suitable detection mechanism. In the example of FIG. 6, the data processing system comprises an RFID reader 617 and the additional real-world objects 615 are attached to respective RFID tags 616 based on which the additional real-world objects are detectable and recognizable when placed in a detection range of the RFID reader 617. It will be appreciated that the additional real-world objects may alternatively be detected by another suitable detection mechanism, e.g. based on a QR code. Accordingly, the system may comprise a detection device for detecting additional real-world objects. The detection device may be a camera, a detection device using a radio-frequency signal, a barcode scanner, and/or the like.

For example, while scanning a real-world object 506, the user may place a number of figurines 615 that are each attached to an RFID tag 616 on the RFID reader. Each tag 616 may represent a virtual character having respective digital behavioral attributes. The process may then assign a combination, e.g. a random mix, of the behavioral attributes of the virtual characters represented by the tags 616 to the virtual object 506 created based on the scanned digital representation. The assignment of attributes based on detected additional real-world objects may be performed automatically or in a user-assisted manner. For example, in one embodiment, the detection of tags may 616 may cause the attributes represented by them to be available in a menu of selectable attributes, from which the user may select a set of attributes to be assigned to the created virtual object 501.

In some embodiments, the process may create one or more additional virtual objects based on the detected additional real-world objects. The additional virtual objects may have associated with them one or more attributes, and the process may assign one or more attributes to the virtual object 501 based on attributes of the additional virtual objects.

Generally, the assignment of attributes may be based on an additional input from one or more electronic devices associated with the system, other than the sensor device than is used to scan the real-world object. For example, during scanning, the system may obtain a current state or other input from the one or more electronic devices and use the obtained input to assign new (or modify existing) attributes to the created virtual object. This may be done automatically or in a user-assisted manner. For example, the system may obtain input from the electronic device(s) and make new/modified attributes available to the user for manual assignment, based on the parameters it receives.

In one particular example, the system may comprise a virtual reality system. During the process of scanning the real-world object for creating a corresponding virtual object, a user may be prompted by the system to define how the virtual object is to move in the virtual environment, and the user may perform movements that are sensed by a motion sensing device of the virtual reality system. The captured movements may then be assigned to the virtual object.

Examples of electronic devices from which inputs may be obtained and used for defining attributes of the created virtual object include an electronic device separate from the image capture device, such as an additional sensor which may be integrated into the same housing as the image capture device or be embodied as a physically separate device. Examples of electronic devices include an RFID reader, a VR system, a mobile device, a game controller, a joystick, a steering wheel game controller, a smart TV, a handheld device, etc.

Figure 7:
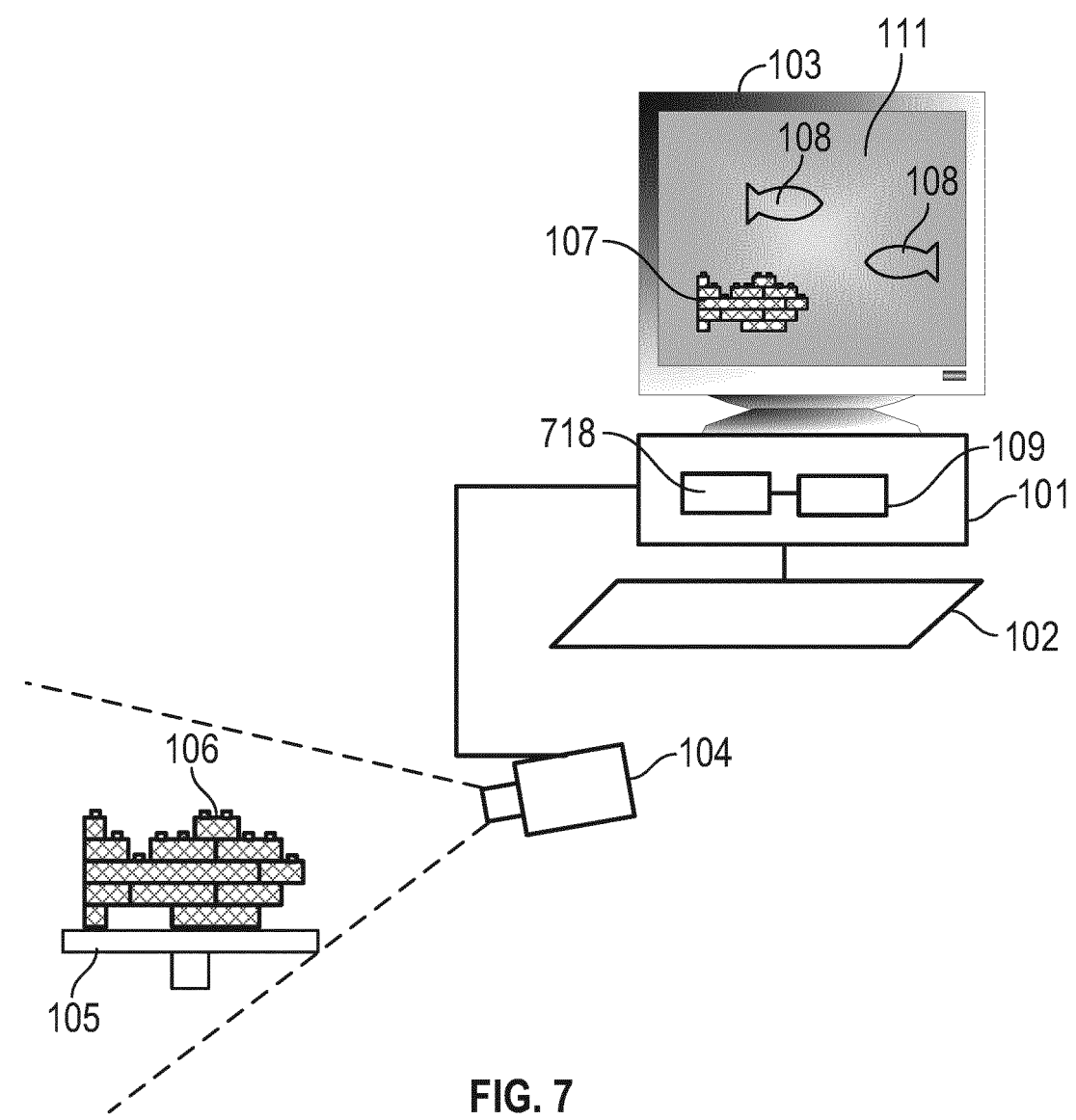
FIGS. 7-9 illustrate further examples of a system for creating a virtual object.
Figure 8:
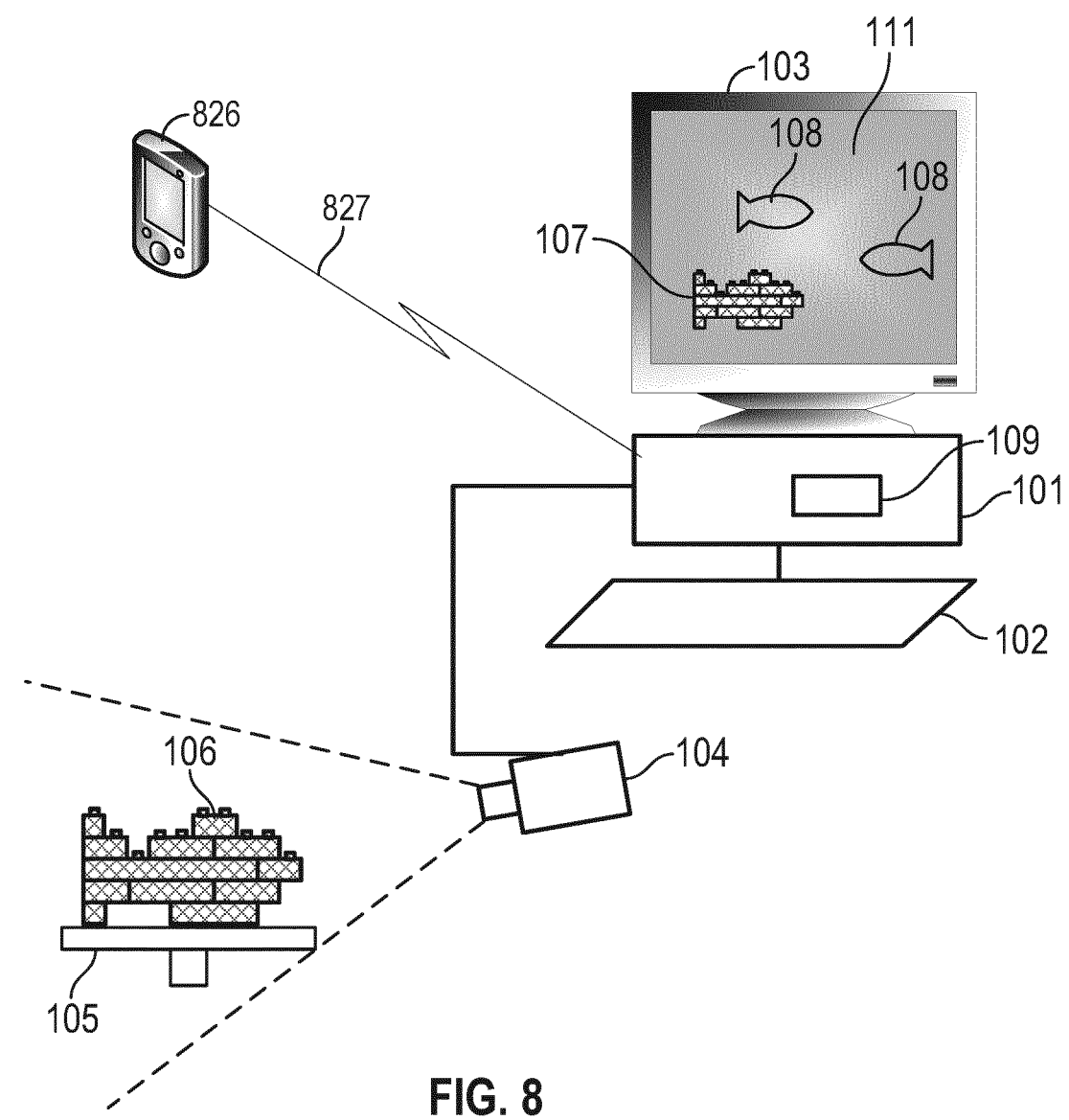
Figure 9:
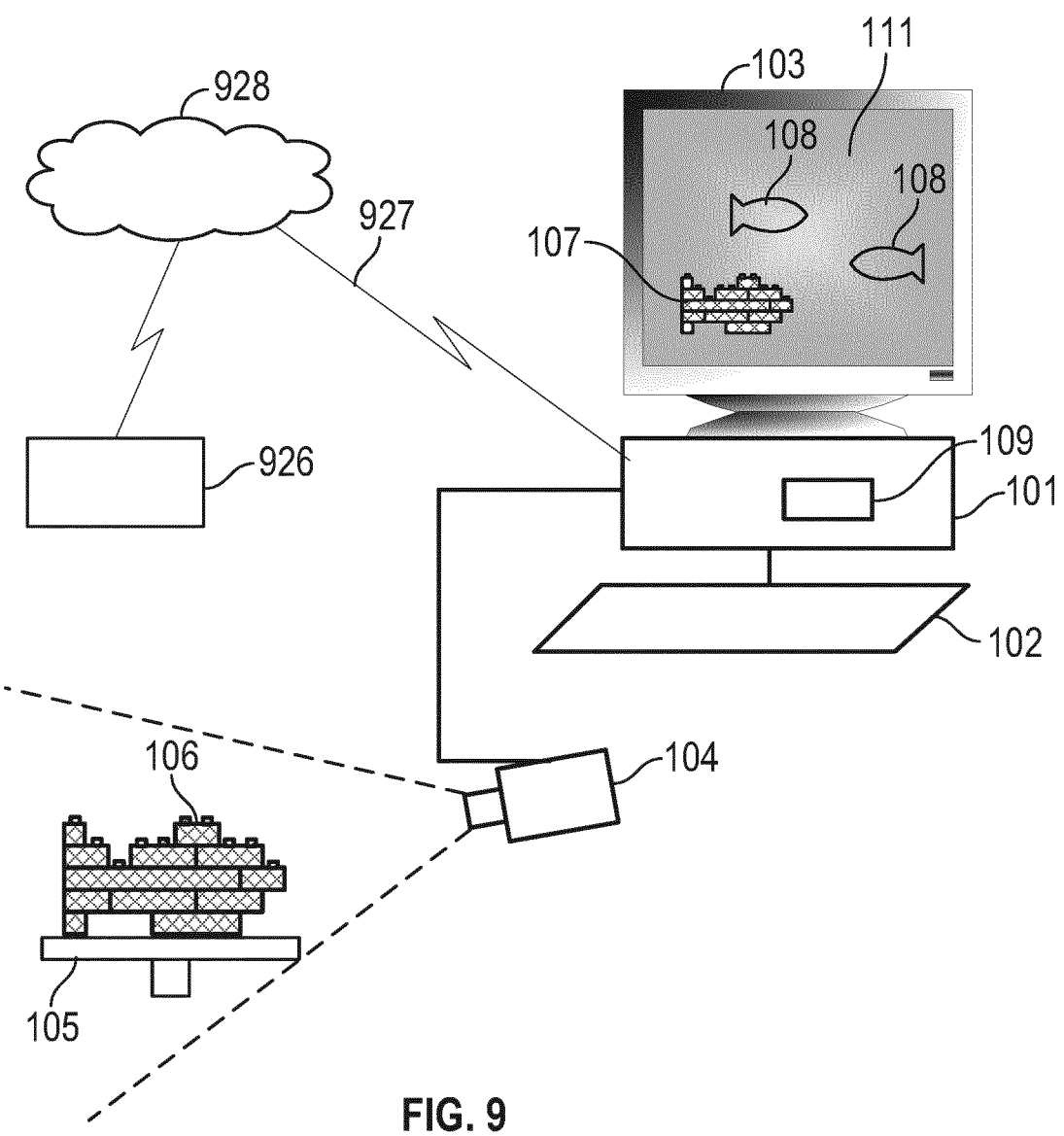

FIGS. 7-9 illustrate further examples of a system for creating a virtual object.

In particular, FIG. 7 shows an embodiment of a toy construction system similar to the one described in connection with FIG. 1. The system comprises a computer 101, an input device 102, a display 103, a sensor device comprising a camera 104, an object support comprising a turntable 105, and a toy construction model 106 constructed from one or more toy construction elements, all as described in connection with FIG. 1.

The computer 101 may be a personal computer, a desktop computer, a laptop computer, a handheld computer such as a tablet computer, a smartphone or the like, a game console, a handheld entertainment device, or any other suitably programmable computer. The computer 101 comprises a processor 109 such as a Central Processing Unit (CPU) and one or more storage devices such as a memory, a hard disk, and/or the like, also all as described in connection with FIG. 1.

In addition the computer 101 comprises an additional information source 718, e.g. a sensor or data storage, operable to provide an input indicative of one or more properties of an entity different from the real-world object 106.

The computer 101 has stored thereon a program, e.g. an App or other software application, adapted to simulate a virtual environment, to process captured images and to create virtual objects as described herein. To this end, the computer may assign one or more attributes to the created virtual objects at least in part based on an input received from the additional information source 718 as described herein.

It will be appreciated that the additional information source 718 may be integrated into the same housing as the computer and/or the display and/or the image capture device. In other embodiments, the additional information source may be a peripheral device that is connectable to the computer, e.g. by a wired or wireless connection, or the sensor may otherwise be communicatively coupled to the computer.

The additional information source 718 may be a sensor operable to detect a property of the environment of the computer, e.g. detect the presence of another real-world object, recognise another real-world object within the environment, detect a property of another real-world object, and/or the like. Examples of such sensors may include an IR sensor, a light sensor, a proximity sensor, an RFID/NFC reader, a microphone, a camera, and accelerometer, etc.

Alternatively, the additional information source 718 may be a data storage device or another device operable to provide game session data and/or user profile data. Based on the user profile data and/or game session data, the computer may automatically assign attributes or make attributes available to the user for manual assignment.

Examples of user profile data may include user profile data associated with a social network, user account data, customer account data, etc. The computer may thus assign attributes (or make them available for assignment) based on user preferences, account activity, activity on a social network, previous purchases, etc. The user profile data may be indicative of a property of a single user or of a group of users, e.g. a group of a social network of which the user is a member. For example, such group-related data may include achievements of group members in an online activity, a colour scheme, insignia, flag, etc. associated with the group.

Examples of game session data include data indicative of a game state, player progression, experience/health points, a current location in the virtual environment, etc.

FIG. 8 shows another embodiment of a toy construction system similar to the one described in connection with FIG. 1. The system comprises a computer 101, an input device 102, a display 103, a sensor device comprising a camera 104, an object support comprising a turntable 105, and a toy construction model 106 constructed from one or more toy construction elements, all as described in connection with FIG. 1.

In addition, the computer 101 is communicatively coupled to another external electronic device 826, such as a mobile phone, a smart phone, a tablet computer, or another electronic device. The connection 827 may be a short-range wireless connection, e.g. using IR technology, RF signals, Bluetooth, wifi, or the like.

The computer 101 has stored thereon a program, e.g. an App or other software application, adapted to create and control a virtual environment, to process captured images and to create virtual objects as described herein. To this end, the computer may assign one or more attributes to the created virtual objects at least in part based on an input received from the electronic device 826 as described herein. The input received from the electronic device may be indicative of a property of the electronic device itself, e.g. an operational state of the device, indicative of data stored by the electronic device, or an input received by the electronic device and/or the like. More specifically, the input received from the electronic device may be indicative of one or more of the following: an input from an accelerometer of the electronic device, input indicative of a time/date/weather or other environmental property at the location of the electronic device, health data, GPS coordinates or other location information of the electronic device, information about—or data received from—one or more programs/apps stored on or executed by the electronic device, information of one or more contacts stored by the electronic device, input from a light sensor, a microphone, a camera or a touchscreen of the electronic device, etc.

For example, the digital game may be running on a mobile device, or be networked with mobile device(s) e.g. as a group of mobile devices or as a game console/PC companion app.

In one particular embodiment, a user scans a real-world object resembling a creature. During the scanning process the game makes reference to mobile device data parameter and assigns attributes to a corresponding virtual creature based on the data from the mobile device. For example, the game may instruct the user to shake the mobile device to make the creature angry. The game may also register that the current time is midnight and unlock a 'vampire' attribute of the creature. When the GPS location of the device is visible the creature may speak a language based on the registered location.

FIG. 9 shows another embodiment of a toy construction system similar to the one described in connection with FIG. 1. The system comprises a computer 101, an input device 102, a display 103, a sensor device comprising a camera 104, an object support comprising a turntable 105, and a toy construction model 106 constructed from one or more toy construction elements, all as described in connection with FIG. 1.

In addition, the computer 101 is communicatively coupled to a computer network 928, e.g. the internet. The computer 101 may thus comprise a suitable network interface 927, e.g. a wired or wireless network adaptor.

The computer 101 has stored thereon a program, e.g. an App or other software application, adapted to create and control a virtual environment, to process captured images and to create virtual objects as described herein. To this end, the computer may assign one or more attributes to the created virtual objects at least in part based on an input received from a remote host 926 via the computer network 928. Examples of input received via a computer network may include data from a social network, an online game, an internet community, etc.

Figure 10:
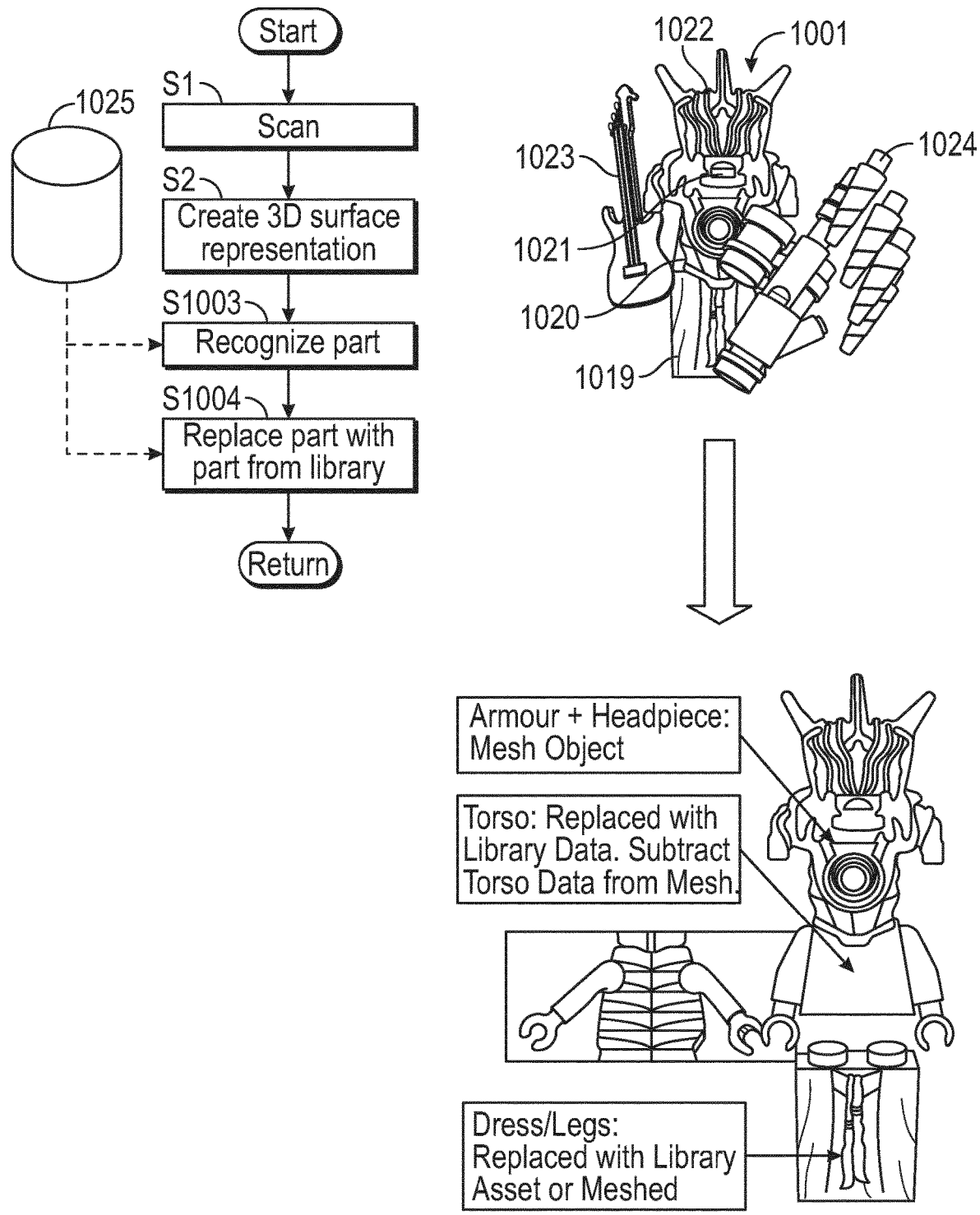
FIG. 10 illustrates another example of a process for creating a virtual object.

FIG. 10 illustrates another example of a process for creating a virtual object. In initial steps S1 and S2, the process obtains data indicative of the visual appearance of a toy construction model or of another real-world object and constructs a 3D digital representation of the toy construction model from the obtained data, e.g. from the digital images as described in connection with steps S1 and S2 of the embodiment of FIG. 2. The 3D digital representation may be a surface mesh representation or another suitable 3D digital representation. In the example illustrated in FIG. 13, the real-world object is a toy construction model in the form of a figurine 1301 assembled from a plurality of toy construction elements, e.g. elements resembling a leg portion 1319 of the figure, a torso portion 1320 of the figurine, a head portion 1321 of the figurine, an armoured helmet 1322 worn by the figurine, and a number of accessories 1323 and 1324 carried by the figurine. It will be appreciated that the process may also be performed based on another type of toy construction model constructing from other types of toy construction elements.

In step S1303, the process detects one or more toy construction elements of the toy construction model, e.g. based on a library 1325 of known toy construction elements. In particular, it has been realized that, for the purpose of creating a virtual object, it may not be necessary to recognize all toy construction elements of a model, but it may suffice to recognize certain types of toy construction elements. In particular, some parts of a virtual object are more important for a realistic animation of the characteristics of a virtual object than others. For example, the torso and/or leg parts of a figurine may be more important for a suitable animation of a movement of the virtual figurine than e.g. a helmet or an accessory. Similarly, the wheels of a car may be more important for an animation of the car than e.g. parts of the chassis.

Hence, by providing a library of selected known toy construction elements along with their characteristics, e.g. movement characteristics, allows for a creation of virtual objects that exhibit a rich behavior in a virtual environment while reducing the computational tasks associated with the recognition of multiple toy construction elements of a toy construction model. The library 1325 of known toy construction elements may have stored therein 3D representations of the known toy construction elements, e.g. in the form of a surface mesh representation, a voxel representation, a CAD representation or the like, e.g. as described in WO 2004/034333. The known toy construction elements may further be stored with one or more attributes associated with them, e.g. a color, a skeleton for facilitating the animation of movements, one or more animation routines, one or more other functional characteristics.

It will be appreciated that the recognition of a subset of the toy construction elements of a toy construction model may be performed using a recognition process known as such in the art, e.g. by matching a 3D models of the known toy construction elements to parts of the obtained 3D model of the toy construction model and/or by the use of neural networks or other adaptive, data-driven techniques, e.g. as described in WO 2016/075081.

In the example of FIG. 10, the process has detected the torso part 1320 of the figurine as a known torso part stored in the library of known torso parts. It will be appreciated that, alternatively or additionally, the process may recognise other known parts, e.g. the leg portion 1319.

In subsequent step S1304, the process replaces the part of the 3D digital representation of the toy construction model that has been recognized as corresponding to the known toy construction element with the corresponding 3D representation of the known toy construction element as retrieved from the library 1325. This replacement is schematically illustrated in the bottom right of FIG. 10.

The thus modified 3D representation generated in step S1304 may then be used as a 3D representation of a virtual object in a virtual environment. To this end the predefined attributes of the known toy construction element that has replaced a part of the 3D representation may be automatically assigned to the corresponding part of the 3D virtual object.

Nevertheless, it will be appreciated that the process may further allow a user-assisted assignment of attributes by one of the mechanisms described herein. Such attributes may be assigned to the part of the virtual object that has resulted from the replacement step 1304, as this part is now easily selectable by the user, e.g. as was described with reference to FIG. 4 above.

Alternatively or additionally, attributes may be assigned to other parts of the virtual object as selected by the user.

Examples of replacement of parts of the 3D representation by known elements include:

A torso of a figurine is recognised and replaced. The underlying bone structure to animate the known part is also associated with the part that has been added to replace the original mesh. The user may then manually select the torso to assign further attributes, e.g. a 'Ninja' or 'Strongman' attribute, defining how the torso is animated to move. The same may be done for the legs, head etc.

Wheels on a car or other vehicle are recognised and replaced. The rotational axis of the wheel is associated as an attribute with the known wheel; the user may define further attributes, e.g. the global behaviour of the car to define how the car drives and how much grip attribute the tyres are assigned.

A toy construction element with a graphic marker is recognised and replaced by a known element. As described above, directional information of the surface of the recognised part is also known. The user may then assign an attribute manually. For example assigning a water cannon attribute to an element with a graphic flame marker may result in hot water being sprayed that could melt ice in a computer game.

In some embodiments, the process automatically detects and replaces colors and/or graphic markers and allows a user to manually control an animation and display of features associated with the colors or markers via attributes. This type of recognition and replacement may be performed independently of any recognition of toy construction elements. Unlike the embodiments described above, where color or markers are used as a selectable region to apply attributes, this embodiment uses a recognized marker as an auto-target for animation and/or a recognized color as an auto-target for visual effects. The choice of effects or animations may still be applied responsive to a user selection, either globally or locally. Examples of such embodiments include:

Graphic markers on a creature's eyes are recognized and the corresponding animation targets are overlaid on to the virtual object. If the user selects the global attribute 'angry monster', angry eye animations are displayed. Alternatively, the user could locally define that the left eye will be 'angry monster' and the right be 'cute girly monster'.

Colors on a creature are recognized and corresponding animation targets are overlaid over the regions. For example, the user can locally assign 'fur' display attribute to all green areas and green fur appears to grow out of the green regions. Globally the user could assign 'bee' to the whole object and the process would assign yellow and black 'fuzz' display attributes to the different colored regions.

FIGS. 11A-D and 12-13 illustrate further examples of a process for creating a virtual object based on multiple real-world construction models, each constructed from respective pluralities of toy construction elements.

To this end, a process may obtain digital representations of two or more real-world toy construction models, e.g. by means of a system as described in connection with any one of FIG. 1 or 7-9 and/or e.g. by performing steps S1 and S2 of the method described in connection with FIG. 2.

In particular, FIGS. 11A-D illustrate an example of a process which obtains a first and a second digital representation of a first and a second real-world toy construction model, where the first toy construction model is a partial model and the second toy construction model is a complete model that includes the first toy construction model as a substructure.

Figure 11A:
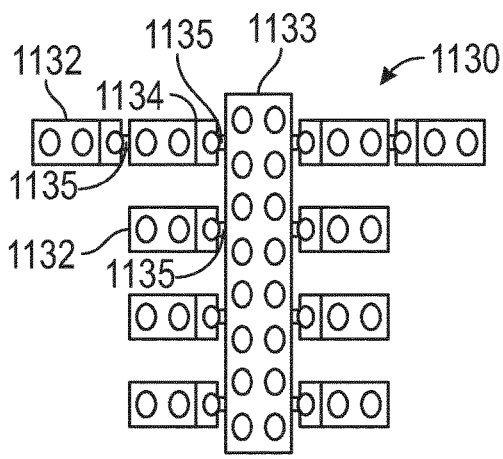
FIGS. 11A-D and 12-13 illustrate further examples of a process for creating a virtual object based on multiple real-world objects.
Figure 11B:
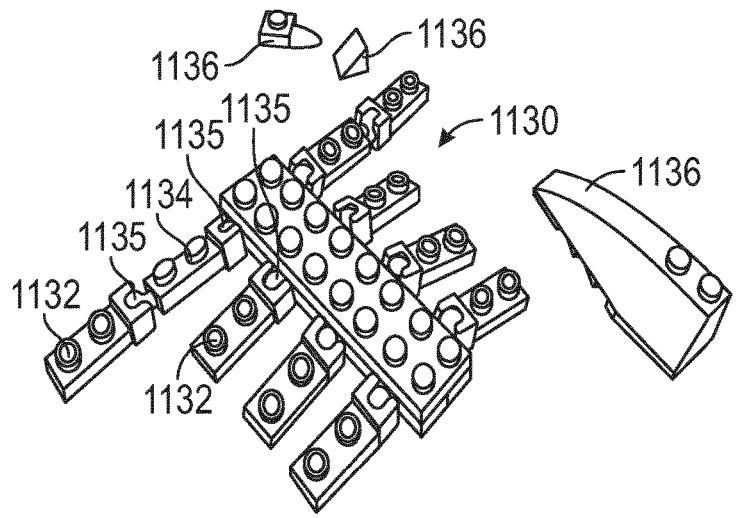
Figure 11C:
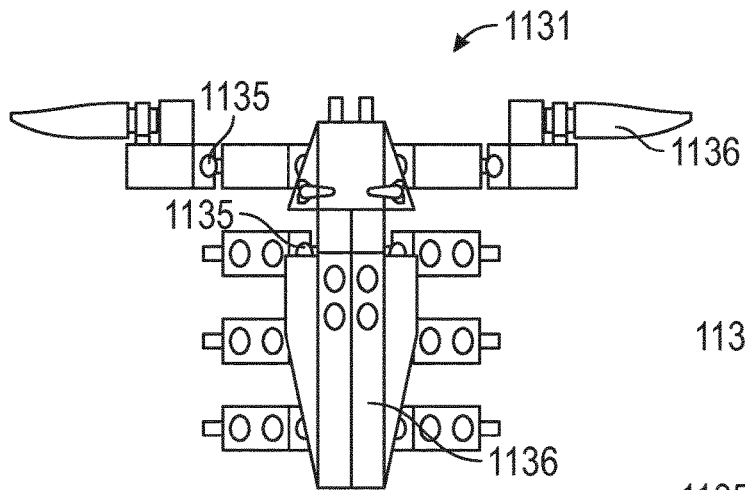
Figure 11D:
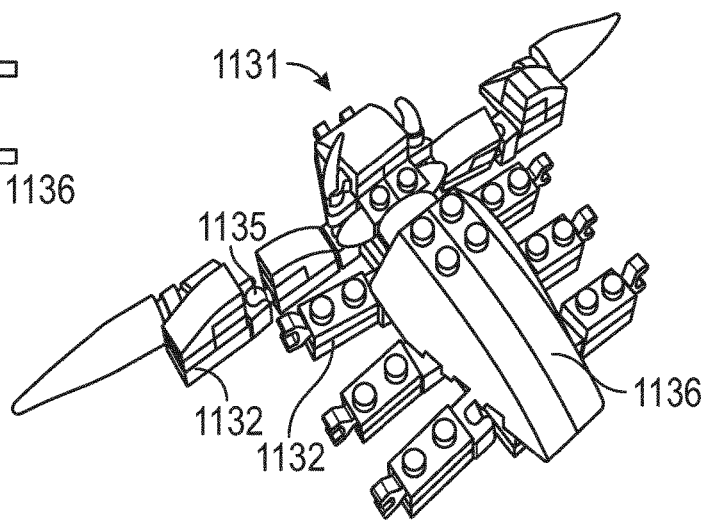

FIGS. 11A-B show the first, partial toy construction model 1130 while FIGS. 11C-D show the second, complete toy construction model 1131. In this particular example, the first toy construction model comprises a selection of relatively simple, easily recognisable toy construction elements 1132, 1134, 1135 that are interconnectable to each other by joint-like connections 1135 so as to form a skeleton. The skeleton comprises a back-bone element 1133 and movable limb elements 1132, 1134. The toy construction elements 1132, 1134, 1135 forming the skeleton further comprise coupling members to which further, decorative toy construction elements can be attached, e.g. toy construction elements 1136 shown in FIG. 11B.

The second toy construction model 1131 includes the first toy construction model but with additional decorative toy construction elements attached. The resulting second toy construction model thus comprises multiple parts which can be moved relative to each other where the available movements are defined by the skeleton elements 1132, 1134, 1133 and their respective interconnections 1135. In this example, the decorative elements 1136 do not contribute to the available movements. As can be seen from a comparison of FIGS. 11B and 11D, the individual skeleton elements and their interconnections are easily recognisable from the partial toy construction model 1130 while they are more difficult to discern from the complete toy construction model 1131. However, the visual appearance of the final model is more readily recognisable from the complete toy construction model 1131.

Accordingly, the process may obtain a first digital representation of the first, partial toy construction model 1130 and a second digital representation of the second, complete toy construction model 1131. The process may then create a virtual object resembling the second toy construction model, e.g. in this example a 6-legged creature. The process may further recognise the toy construction elements 1132, 1134 and 1133 and/or the positions and orientations of the joint-like connectors 1135. Based on this information, the process may identify corresponding articulation points in the created virtual object so as to allow an animation of the legs of the 6-legged creature. The process may even define a virtual skeleton of the created virtual object based on the information obtained from the first digital representation. It will be appreciated that other embodiments of this process may be based on other types of movably interconnectable skeleton toy construction elements, e.g. using other types of movable connections, other than joint like elements.

Generally, the first, partial toy construction model defines a skeleton of a second, complete toy construction model and a set of movement rules. The process is configured to recognise the skeleton and movement rules based on a digital representation of the partial toy construction model and to assign movement attributes to a virtual object that is created based on a digital representation of the second, complete toy construction model.

This may thus be done in a two stage process where the user first builds and scans a simple skeleton using identifiable skeleton elements, e.g. comprising hinge and ball joints, to define areas where movement can be animated. The user then adds more decorative bricks to finish the appearance of the model and rescans the complete model. The computer automatically aligns the scans and uses the first scan as a 'bone structure' to animate the second. A series of animation templates (walk cycles, jumps, attacks etc) may even be mapped to user controls by the user or the computer could assign behavior attributes automatically.

Generally, in some embodiments, the process may map one or more parts of a first real-world object to corresponding parts of a virtual object created from a second real-world object and determine one or more properties of the one or more parts of the first real-world object. Based on these properties the process may then assign one or more local attributes to the corresponding parts of the created virtual object.

Figure 12:
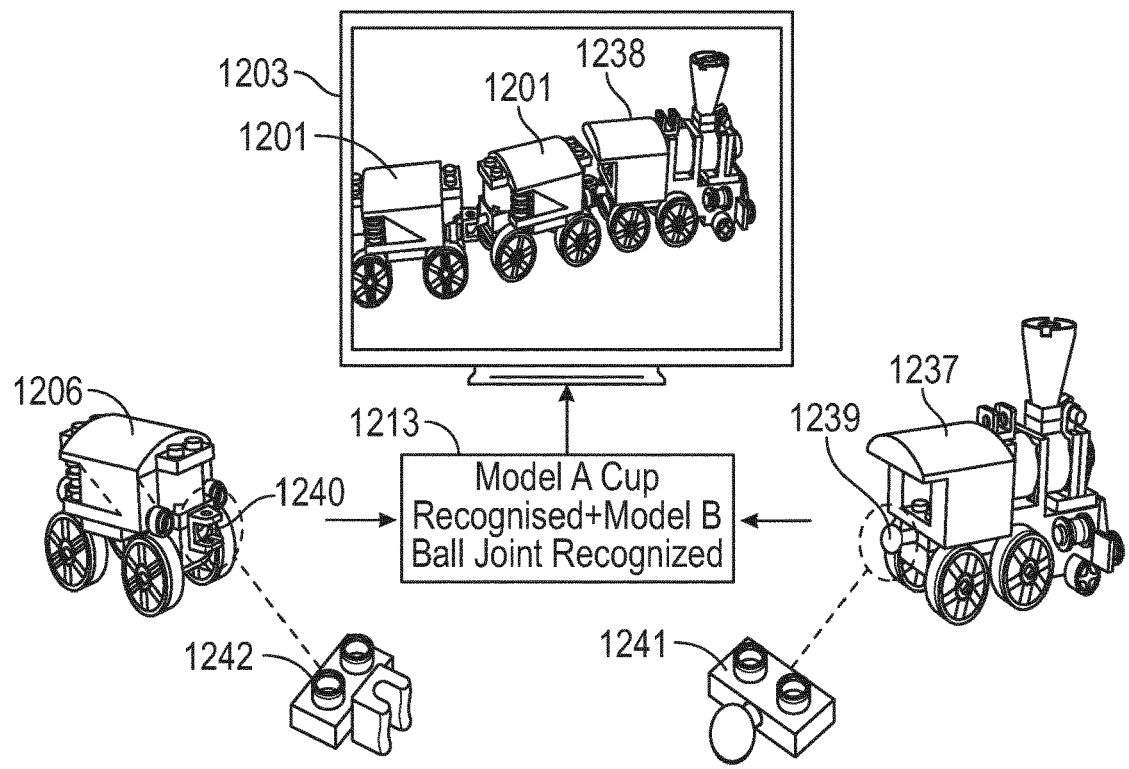

FIG. 12 illustrates an example of a process where virtual objects created from digital representations of respective real-world toy construction models are connected with each other in the virtual environment so as to form a combined virtual object.

In particular, it may be difficult, or at least computationally expensive, to reliably recognise all toy construction elements of a real-world toy construction model based on an obtained digital representation. Therefore, it may be difficult to create a combined virtual object that realistically reflects how the corresponding real-world toy construction models can be physically attached to each other while conforming to the construction rules imposed by the toy construction system. When the digital representation is a digital mesh rather than a representation of recognised toy construction elements, a realistic combination of virtual objects may be even more difficult.

Therefore, in some embodiments the toy construction set includes a subset of predetermined connection elements (for example ball joint or click hinges), and the process is configured to recognise the connection elements when comprised in a toy construction model. To this end, the connection elements may be provided with a unique colour, or they may be decorated distinctively or otherwise easily recognisable. When the process recognizes a connection element in an obtained digital representation, the process may assign a a virtual connection point (or "snap to" point) to the created virtual object at a position corresponding to the position of the recognised connection element within the real-world toy construction model. The virtual connection point may thus define a location where another virtual object can be attached and it may define how the virtual objects may move relative to each other when they are combined to form a combined virtual object. This allows a digital representation (e.g. a 3D mesh) with a recognized connection point to be joined spatially and animated in the virtual environment. It may be appreciated that the subset of connection elements may comprise different types of connection elements, e.g. male and female connection elements. The connection elements may form a true subset of the toy construction elements comprised in the model, i.e. the toy construction model may comprise toy construction elements other than the connection elements. Connection points of a virtual object may e.g. be represented as described in WO 2004/034333.

The process illustrated in FIG. 12 initially obtains a digital representation of a real-world object 1206. The process further detects a connection element 1242 or at least a visible part 1240 thereof and creates a virtual object 1201 in a virtual environment which is displayed on a display 1203 of the system, e.g. as described in connection with step S4 of the method of FIG. 2. The process further assigns a virtual connection point to the created virtual object. The process further obtains a digital representation of another real-world object 1237, detects a connection element 1241 or at least a visible part 1239 thereof and creates a virtual object 1238 in a virtual environment which is displayed on a display 1203 of the system. The process may then create a combined virtual object—in this example a train comprising an engine 1238 and cars 1201—where the train is based on the digital representations of multiple real-world objects virtually attached to each other at the assigned connection points.

Accordingly, the user may create a repository of virtual objects that have virtual attachment points such that different virtual objects may be interconnected with each other in the virtual world so as to create combined virtual models. For example, this may allow a user to attach virtual accessories to a base model.

Figure 13:
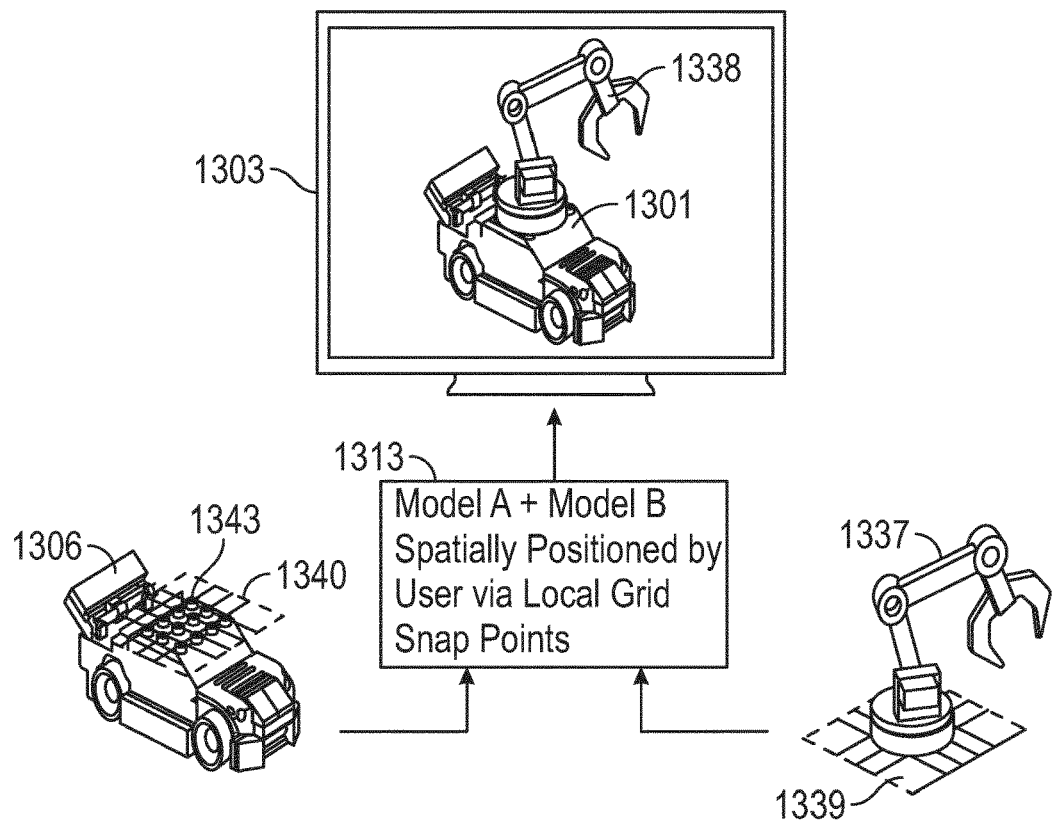

FIG. 13 illustrates another example of a process that recognizes connection points. In this example, the recognition is not necessarily based on a subset of predetermined connection elements but on the detection of coupling members of the toy construction elements of the toy construction model. The coupling members may be detected by the process using a suitable recognition process, e.g. based on feature detection or other computer vision techniques known as such in the art. Many toy construction elements have visible coupling members for engaging corresponding, e.g. mating coupling members of other toy construction elements of the toy construction system. The positions of the coupling members on the toy construction elements may follow a set of rules. For example, the coupling members may be positioned on grid points of a regular grid. Knowledge of the set of rules may facilitate recognition of the coupling members from an obtained digital representation of a toy construction model. Moreover, based on one or more recognized coupling members, the process may estimate/extrapolate other valid/likely positions within the model where coupling members may be positioned in accordance with the set of rules of the toy construction system, e.g. a predetermined relative distances/positions from each other. The process may even determine possible locations of coupling members without detecting actual coupling members, e.g. by detecting a plane sufficiently large to allow positioning of coupling members.

In particular, the process illustrated in FIG. 13 initially obtains a digital representation of a real-world object 1306. The process further detects one or more coupling members (in this example knob-like protrusions which may e.g. be detected using ellipse detection) 1343 on a top surface of the real-world object. In this example, the coupling members are arranged as a regular 2D grid on the top surface, as illustrated by grid 1340. Based on the detection of one or more coupling members, the process can establish the grid locations of the grid of coupling members. Based on the obtained digital representation, the process creates a virtual object 1301 and adds connection points in the form of a virtual grid of virtual coupling members to the top surface of the virtual object where the virtual grid is consistent with the detected coupling member.

The process further obtains a digital representation of another real-world object 1337, detects one or more coupling member or at least a surface—in this example a bottom surface—that is consistent with a grid 1339 of coupling members. The process then creates a corresponding virtual object 1338 and assigns to it a corresponding virtual grid of virtual coupling members.

The process may then create a combined virtual object—in this example a car 1301 having an excavator arm 1338 attached to its roof. The combined virtual object is created by attaching the individual virtual objects 1301 and 1338 to another where the created grids of virtual coupling members define how the virtual objects can be connected to each other.

In the above and in the following examples, creating a combined virtual object from multiple virtual objects may be performed in a user-assisted manner. For example, the user (or the process) may select two virtual objects to be combined and the process may highlight the available connection points on both virtual objects. The user may then position one virtual object in a proximity of the other virtual object with the desired connection points facing each other. This may case the virtual objects to snap together at the connection points so as to form a combined virtual object.

It will be appreciated that a virtual object that has been created based on an obtained digital representation of a real-world toy construction model may be combined with another virtual object irrespective of how said other virtual object has been created. For example, the other virtual object may have been created from a real-world toy construction model, it may have been pre-installed with the virtual environment or otherwise created without reference to any real-world object.

Nevertheless, the other virtual object may comprise a set of virtual connection points to which other virtual objects and, in particular, virtual objects created from real-world toy construction models, may be connected.

Figure 14:
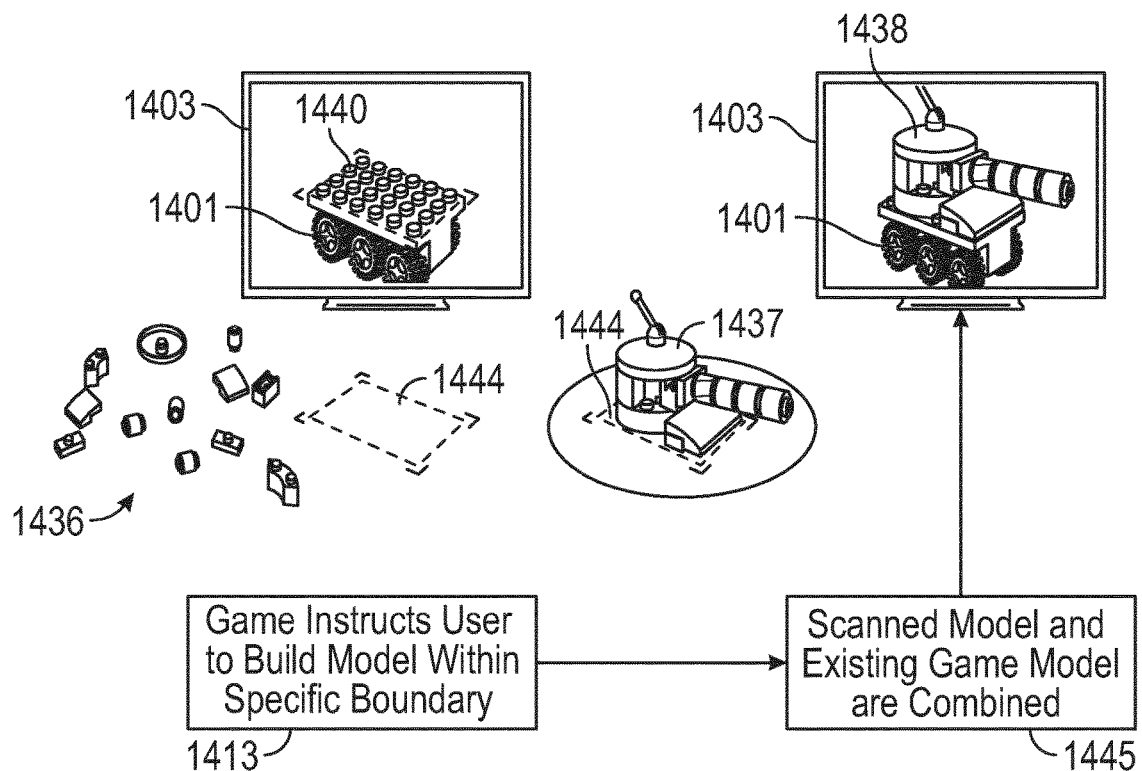
FIG. 14 illustrates another example of a process for creating a virtual object based on a real-world object and an existing virtual model.

An example of such a scenario is illustrated in FIG. 14. In the example of FIG. 14, the process presents a previously created virtual object 1401 on a display 1403 of a game system. The virtual object defines a plurality of connection points 1440, e.g. in the form of a regular grid of connection points. The presentation of the virtual object may be triggered by a game event, such as the start or completion of a game level, task, or the like, based on a user selection, etc. The virtual connection points 1440 and their geometric arrangement resemble real-world coupling members of a real-world toy construction system.

The process may instruct (block 1413) the user to construct a real-world toy construction model 1437 from real-world toy construction elements 1436 such that the constructed toy construction model is connectable to a set of coupling members corresponding to the virtual connection points 1440 of the presented virtual object. For example, the user may be instructed to construct the toy construction model such that it fits within a footprint 1444 corresponding to the grid of virtual coupling members 1440. In some embodiments, the user may be instructed to construct the toy construction model on top of a base plate or other base element that defines coupling members corresponding to the virtual coupling points 1440 of the virtual object.

Subsequently, as illustrated by block 1445, the process obtains a digital representation of the constructed real-world toy construction model, e.g. by means of a system as described in connection with any one of FIG. 1 or 7-9 and/or e.g. by performing steps S1 and S2 of the method described in connection with FIG. 2. The process then creates a virtual object 1438 from the obtained digital representation, e.g. as described in connection with step S4 of FIG. 2. The process further creates a combined virtual object as a combination of the virtual object 1401 and the newly created virtual object 1438 where the virtual objects are joined at the connection points 1440 of the virtual object 1401. To this end, the newly created virtual object 1438 is thus created with a set of connection points mating the connection points 1440 of virtual object 1401, e.g. as described above. The combined virtual object is thus created based on the obtained digital representation of the real-world object 1437 and from information, in this example connectivity information, about the virtual object 1401.

Many digital games include an element of evolution where virtual objects evolve during the course of the game as the player progresses. The evolution of virtual objects often involves a change of appearance of the virtual objects. When inserting virtual objects into a game based on captured images or other representations of user-constructed toy models it may be desirable that the user does not need to completely re-build a model and convert it into a virtual object too many times even though the user may actually only make minor adjustments to a virtual object, e.g. during a game level, while retaining attributes of the original virtual object. A more enjoyable flow would be to build a model at the beginning of the level and then make small adjustments, e.g. so as to overcome challenges throughout the level. A rebuild of a model can mean that toy construction elements are added, taken away, and/or rearranged or a combination of all.

Figure 15:
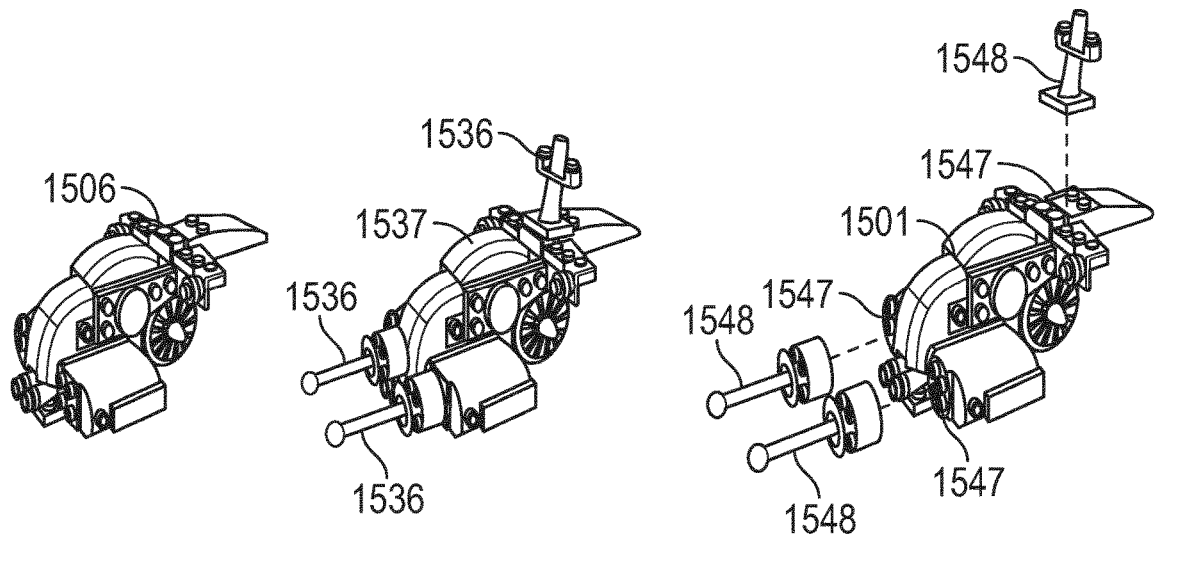
FIGS. 15-17 illustrate yet further examples of a process for creating a virtual object based on multiple real-world objects.

FIG. 15 illustrates an example of a process where the user creates an updated virtual object by adding real-world toy construction elements to a real-world toy construction model that has previously served as a basis for a previous virtual object.

In particular, in block 1513, the process initially obtains a digital representation of—and creates a virtual object from—a constructed real-world toy construction model 1506, e.g. by means of a system as described in connection with any one of FIG. 1 or 7-9 and/or e.g. by performing steps S1, S2 and S4 of the method described in connection with FIG. 2. Subsequently, the user adds additional toy construction elements 1536 to the real-world toy construction model so as to create an updated toy construction model 1537. As illustrated by block 1545, the process then obtains a digital representation of—and creates a virtual object from—the updated real-world toy construction model 1537, e.g. by means of a system as described in connection with any one of FIG. 1 or 7-9 and/or e.g. by performing steps S1, S2 and S4 of the method described in connection with FIG. 2.

Subsequently, as illustrated by block 1546, the process compares the previously created virtual object and the subsequently created virtual object so as to identify the added parts. This comparison may be performed based on obtained digital representations (a point cloud, a mesh etc.) or any other suitable representation of the respective virtual objects. The identification of the added parts also allows the process an identification of connection points 1547 of the original virtual object 1501 where the added parts have been added to the original model. The process may thus create a virtual object from which individual virtual parts may be removed as illustrated by virtual object 1501 and virtual parts 1548 in FIG. 15. All local attributes that may previously have been assigned to the original virtual object may still remain assigned to the updated virtual object.

Figure 16:
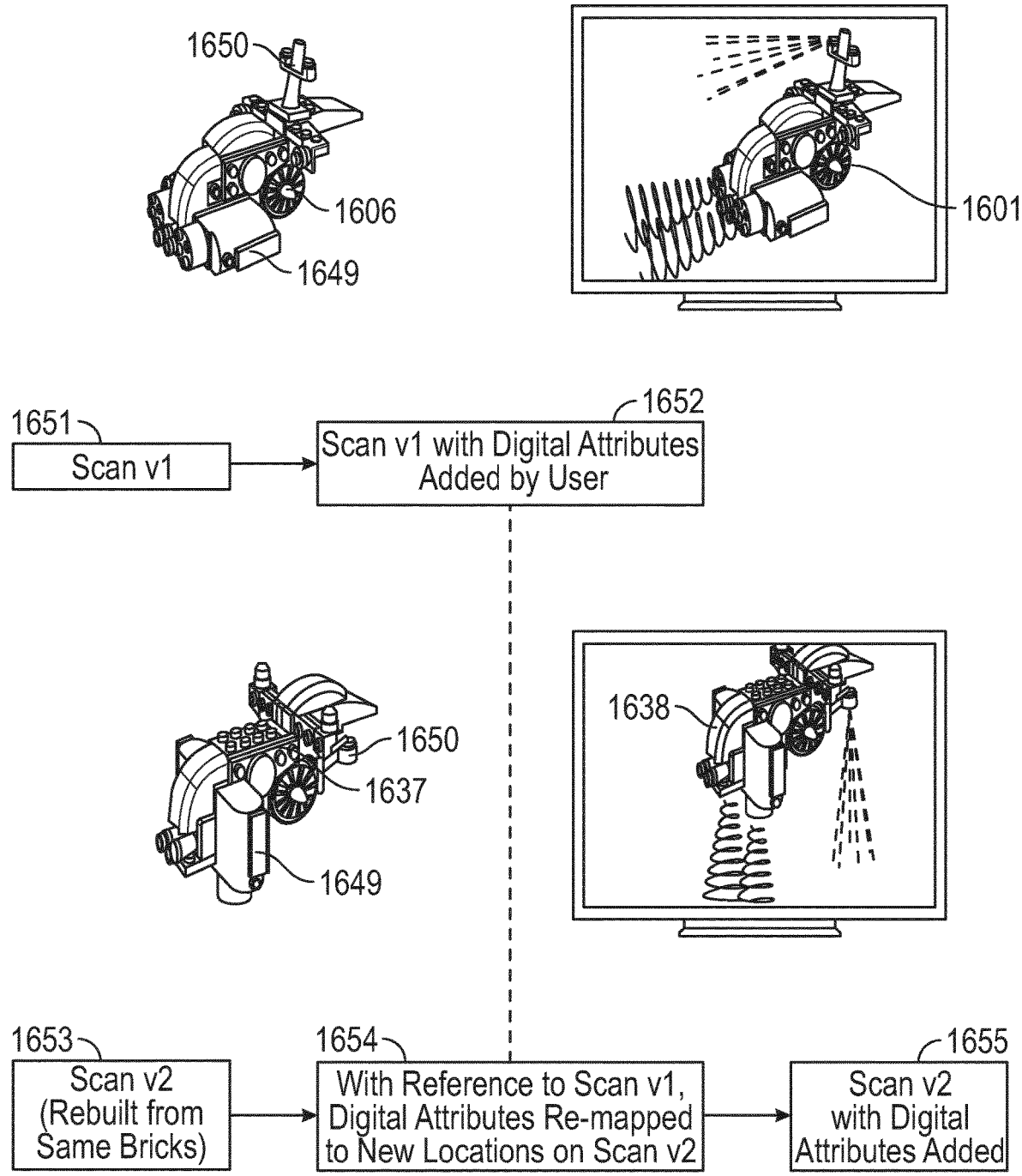

FIG. 16 illustrates a similar process but where the user, rather than adding toy construction elements to a base model, rearranges the toy construction elements that have formed an original model so as to construct an updated toy construction model including the same elements as the original model.

Local attributes that have previously been mapped to parts of an original virtual object (created based on the base model) may then be re-mapped by the process to the corresponding elements of an updated virtual model that is created based on the updated toy construction model.

In particular, in block 1651, the process initially obtains a digital representation of—and creates a virtual object 1601 from—a constructed real-world toy construction model 1606, e.g. by means of a system as described in connection with any one of FIG. 1 or 7-9 and/or e.g. by performing steps S1, S2 and S4 of the method described in connection with FIG. 2. The real-world toy construction model comprises toy construction elements 1649 and 1650. In block 1652, the process assigns local attributes to parts of the created virtual object that correspond to the elements 1649 and 1650 of the real-world model, e.g. as described in connection with FIGS. 3 and 4.

Subsequently, the rearranges the elements 1649 and 1650 so as to create an updated toy construction model 1637. As illustrated by block 1653, the process then obtains a digital representation of—and creates a virtual object 1638 from— the updated real-world toy construction model 1637, e.g. by means of a system as described in connection with any one of FIG. 1 or 7-9 and/or e.g. by performing steps S1, S2 and S4 of the method described in connection with FIG. 2.

Subsequently, as illustrated by blocks 1654-1655, the process compares the previously created virtual object 1601 and the subsequently created virtual object 1638 so as to identify the rearranged parts 1649 and 1650 that have had virtual attributes associated with it in the original model. This comparison may be performed based on obtained digital representations (a point cloud, a mesh etc.) or any other suitable representation of the respective virtual objects. When the model is re-scanned the process may perform a volume analysis to see if the same (approximate) volume of toy construction elements is present. The process further seeks to identify any elements or features that previously had attributes assigned to them. The user can help re-assign if links are lost. The identification of the rearranged parts allows the process to re-map local attributes from the parts of the original virtual object 1601 which correspond to the rearranged elements to the parts of the updated virtual object 1638 that correspond to the re-arranged elements.

Figure 17:
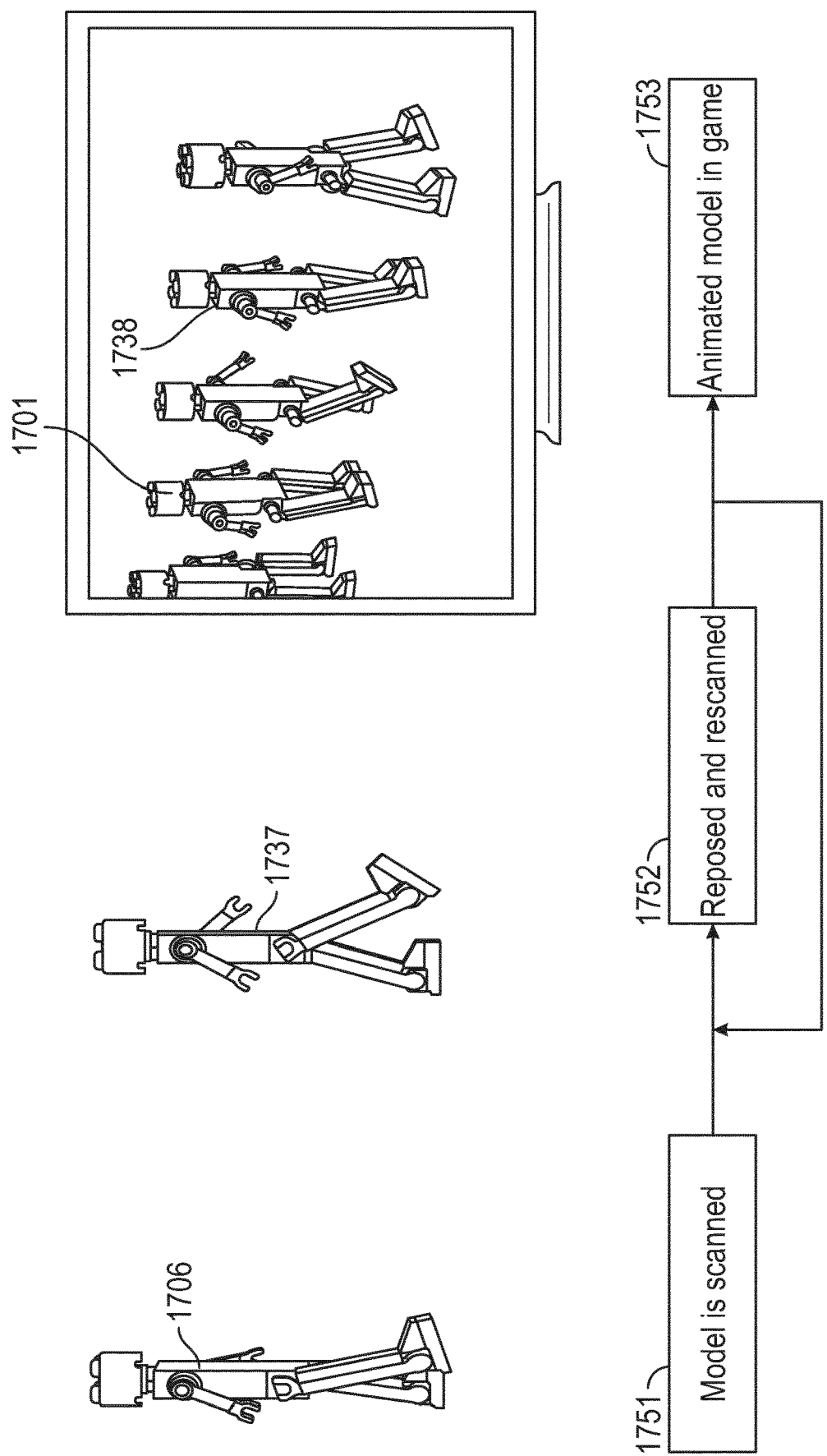

FIG. 17 illustrates an example where the process defines custom animation and display states of a scanned toy construction model. To this end, the process combines a sequence of scans (1751, 1752) of a reposed or rebuilt model 1706, 1737 to display an animation sequence 1701, 1738 like a stop motion animation. This animation may then be assigned to a virtual object as a movement attribute. To this end, the process may even blend the digital representations together to create a smooth animation In other examples, different digital representations of a reposed or rebuild model may be selectively used as a representation of a virtual model responsive to game events, e.g. responsive to user inputs.

Embodiments of the method described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A method, implemented by a data processing system, for creating a virtual object in a virtual environment; the method comprising:
   obtaining, via a scanner with a camera, an image of a first real-world object;
   transmitting, to the data processing system, a captured image of the first real-world object;
   creating, by the data processing system, a digital representation of the first real-world object, the digital representation representing a visual appearance of a shape of the first real-world object;
   obtaining an input indicative of one or more properties of a second object, wherein the second object is based on a second real-world object different from the first real-world object;
   creating a virtual object based on the digital representation of the first real-world object;
   detecting at least one part of the first real-world object that is operable to perform a movement function;
   determining a correspondence between the detected at least one part and a corresponding part of the created virtual object; and
   assigning the movement function to the corresponding part of the created virtual object based on the at least one part of the first real-world object and the obtained input of the one or more properties of the second object.

2. The method according to claim 1, wherein the second object is a virtual object.

3. The method according to claim 1, further comprising:
obtaining via the scanner an image of the second real-world object;
transmitting, to the data processing system, a captured image of the second real-world object; and
creating by the data processing system a digital representation of a second object, the digital representation representing a visual appearance of a shape of the second real-world object.

4. The method according to claim 3, further comprising:
creating a second virtual object, wherein one or more parts of the second virtual object have an appearance corresponding the second object; and
assigning an attribute to the second virtual object;
wherein the attribute is determined at least in part based on the obtained digital representation of the first real-world object.

5. The method according to claim 4, wherein the first real-world object is a first toy construction model being constructed from a first plurality of toy construction elements;
wherein the second real-world object is a second toy construction model being constructed from a second plurality of toy construction elements; and
wherein the toy construction elements of the first and second pluralities of toy construction elements each comprise one or more coupling members configured for detachably interconnecting the toy construction elements with each other.

6. The method according to claim 5, wherein the second plurality of toy construction elements includes the first plurality of toy construction elements.

7. The method according to claim 1, wherein the movement function is indicative of at least a first and a second state of the virtual object; and
wherein the method comprises representing the at least first and second states of the virtual object; wherein the first state is based on the obtained first digital representation and the second state is based on the obtained second digital representation.

8. The method according to claim 1, further comprising:
detecting one or more other parts of the first real-world object that are movable relative to each other;
determining corresponding one or more parts in the created virtual object; and representing a movement of the determined corresponding one or more parts relative to each other based on the detected one or more parts of the first real-world object.

9. The method according to claim 1, wherein the movement function is indicative of at least a first and a second state of the corresponding part of the virtual object; and
wherein the method comprises representing the at least first and second state of the corresponding part of the virtual object;
wherein the first state is based on the obtained first digital representation and the second state is based on the obtained second digital representation.

10. The method according to claim 4, wherein the attribute is indicative of a visual appearance of the virtual object; and wherein the method comprises representing the virtual object as a combined virtual object, combined from a first object part resembling the first real-world object and a second object part resembling the second object.

11. The method according to claim 10, further comprising:
detecting, based on the obtained first digital representation, a first connection element of the first real-world object;
detecting, based on the obtained second digital representation, a second connection element of the second object, the second connection element being able to engage the first connection element so as to interconnect the first real-world object and the second object with each other;
wherein the first real-world object and second object parts are interconnected at respective first and second virtual connection elements corresponding to the respective first and second connection elements of the first real-world object and the second object.

12. The method according to claim 1, further comprising controlling the virtual object in a computer-generated virtual environment to have a behaviour based on the movement function.

13. The method according to claim 1, further comprising storing the virtual object so as to make the virtual object available in the virtual environment independently of the presence of the first real-world object.

14. The method according claim 1, wherein obtaining the digital representation comprises receiving input data from a sensor device, the input data being indicative of the visual appearance of the first real-world object; and
wherein obtaining the input indicative of one or more properties of the second object, based on a second real-world object and different from the first real-world object, comprises receiving said input from a detection device different from the sensor device.

15. The method according to claim 14, wherein the second object comprises said detection device and wherein the property is a property of the detection device.

16. The method according to claim 14, wherein the second object is different from the detection device, and wherein the detection device is operable to detect said property.

17. The data processing system configured to perform the steps of the method according to claim 1.

18. The computer program product comprising program code means adapted to cause, when executed on a data processing system, said data processing system to perform the steps of the method according to claim 1.

19. The toy construction system comprising:
the data processing system as defined in claim 17; and
a plurality of toy construction elements, each of said plurality of toy construction elements comprising one or more coupling members configured for detachably interconnecting the plurality of toy construction elements with each other so as to form a real-world object.

20. The method according to claim 1, wherein the first real-world object is a toy construction model.

* * * * *